United States Patent
Avoinne et al.

(10) Patent No.: US 10,606,339 B2
(45) Date of Patent: Mar. 31, 2020

(54) COHERENT INTERCONNECT POWER REDUCTION USING HARDWARE CONTROLLED SPLIT SNOOP DIRECTORIES

(71) Applicant: QUALCOMM Incorporated, San Diego, CA (US)

(72) Inventors: Christophe Avoinne, Campbell, CA (US); Luc Montperrus, Montigny le Bretonneux (FR); Philippe Boucard, Le Chesnay (FR); Rakesh Kumar Gupta, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 15/259,697

(22) Filed: Sep. 8, 2016

(65) Prior Publication Data

US 2018/0067542 A1    Mar. 8, 2018

(51) Int. Cl.
*G06F 1/3296*   (2019.01)
*G06F 12/0831*  (2016.01)
(Continued)

(52) U.S. Cl.
CPC .......... *G06F 1/3296* (2013.01); *G06F 1/3206* (2013.01); *G06F 1/3275* (2013.01);
(Continued)

(58) Field of Classification Search
CPC .................................................. G06F 1/3296
See application file for complete search history.

(56) References Cited

U.S. PATENT DOCUMENTS 7,089,361 B2    8/2006 Borkenhagen
2008/0077813 A1 3/2008 Keller et al.
(Continued)

OTHER PUBLICATIONS

Power J., et al., "Heterogeneous System Coherence for Integrated CPU-GPU Systems," Proceedings of the 46th Annual IEEE/ACM International Symposium on Microarchitecture (MICRO), Dec. 2013, pp. 457-467.
(Continued)

*Primary Examiner* — Kim Huynh
*Assistant Examiner* — Eric Chang
(74) *Attorney, Agent, or Firm* — The Marbury Law Group/Qualcomm

(57) ABSTRACT

Aspects include computing devices, apparatus, and methods implemented by the apparatus for implementing multiple split snoop directories on a computing device having any number of processors, any number of power domains, and any number of processor caches. For example, various aspects may include enabling a first split snoop directory for a first power domain and a second split snoop directory for a second power domain, wherein the first power domain includes a first plurality of processor caches and the second power domain includes at least one processor cache, determining whether all of the first plurality of processor caches are in a low power state, and disabling the first split snoop directory in response to determining that the first plurality of processor caches are in a low power state. Similar operations may be performed for N number of power domains and M number of processor caches.

30 Claims, 16 Drawing Sheets

(51) Int. Cl.
 *G06F 1/3287* (2019.01)
 *G06F 1/3206* (2019.01)
 *G06F 1/3234* (2019.01)
 *G06F 9/54* (2006.01)

(52) U.S. Cl.
 CPC .............. *G06F 1/3287* (2013.01); *G06F 9/54* (2013.01); *G06F 12/0833* (2013.01); *G06F 2212/1028* (2013.01); *Y02D 10/13* (2018.01)

(56) References Cited

U.S. PATENT DOCUMENTS

| | | |
|---|---|---|
| 2013/0318308 A1 | 11/2013 | Jayasimha et al. |
| 2014/0189411 A1 | 7/2014 | Kanchana et al. |
| 2014/0281180 A1 | 9/2014 | Tune |
| 2014/0281275 A1 | 9/2014 | Kruckemyer et al. |
| 2014/0372696 A1 | 12/2014 | Tune et al. |
| 2015/0268711 A1 | 9/2015 | Ramani et al. |
| 2016/0188471 A1 | 6/2016 | Forrest et al. |
| 2016/0314024 A1* | 10/2016 | Chang .................. G06F 9/5088 |
| 2016/0350229 A1* | 12/2016 | Reed .................. G06F 12/0864 |

OTHER PUBLICATIONS

International Search Report and Written Opinion—PCT/US2017/050450—ISA/EPO—dated Dec. 5, 2017.

\* cited by examiner

| Processor 1 Processor Cache State | Processor 2 Processor Cache State | Split Snoop Directory State |
|---|---|---|
| OFF | OFF | OFF |
| ON | OFF | ON |
| RET | OFF | RET |
| OFF | RET | RET |
| ON | RET | ON |
| RET | RET | RET |
| OFF | ON | ON |
| ON | ON | ON |
| RET | ON | ON |

FIG. 6

COHERENT INTERCONNECT POWER REDUCTION USING HARDWARE CONTROLLED SPLIT SNOOP DIRECTORIES

BACKGROUND

Snoop directories help to increase the performance of coherent multi central processor unit (CPU) cluster systems. Snoop directories can increase snoop miss bandwidth independent of available CPU snoop bandwidth or frequency, reduce performance degradation on a snooped CPU, reduce structural latency to memory, and reduce power consumption for snoop misses. However, to achieve the foregoing benefits, existing snoop directory architectures must compromise among the competing drawbacks of using large amounts of memory, having high dynamic energy consumption, and/or having poor power scalability. These drawbacks, in part, are a result of tags that populate the snoop directory and indicate CPU use of memory location. These tags require high-speed static random access memory (SRAM) macros that consume significant power, especially in lower technology nodes.

SUMMARY

Various disclosed aspects may include apparatuses and methods for implementing multiple split snoop directories on a computing device. Various embodiments may include enabling a first split snoop directory for a first power domain and a second split snoop directory for a second power domain, in which the first power domain may include a plurality of processor caches and the second power domain may include at least one processor cache. Some embodiments may further include determining whether all of the plurality of processor caches are in a low power state and disabling the first split snoop directory in response to determining that all of the plurality of processor caches are in a low power state.

Some embodiments may further include detecting a condition for changing at least one processor cache of the plurality of processor caches to a low power state and sending a request to change the first split snoop directory to a low power state in response to detecting the condition for changing the at least one processor cache to a low power state.

Some embodiments may further include receiving the request to change the first split snoop directory to a low power state, in which determining whether all of the plurality of processor caches are in a low power state may include determining whether all of the plurality of processor caches are in a low power state in response to receiving the request to change the first split snoop directory to a low power state.

Some embodiments may further include receiving a condition for changing at least one processor cache of the plurality of processor caches to a low power state, in which determining whether all of the plurality of processor caches are in a low power state may include determining whether all of the plurality of processor caches are in a low power state in response to detecting the condition for changing the at least one processor cache to a low power state.

In some embodiments, receiving a condition for changing at least one processor cache of the plurality of processor caches to a low power state may include receiving a signal indicating a power state of the at least one processor cache of the plurality of processor caches from the first power domain.

Some embodiments may further include leaving the first split snoop directory enabled in response to determining that at least one processor cache of the plurality of processor caches is in a high power state.

Some embodiments may further include detecting a condition for changing at least one processor cache of the plurality of processor caches to a high power state, and enabling the first split snoop directory in response to detecting the condition for changing the at least one processor cache to a high power state and determining that the plurality of processor caches are in a low power state.

In some embodiments, a low power state may include one of an "OFF" state and a "RET" (retention) state, and a high power state may include an "ON" state.

Some embodiments may further include enabling N split snoop directories for N power domains and M split snoop directories for M power domains, in which N and M may be integers greater than 1, the N power domains may include N pluralities of processor caches and the M power domain may include at least one processor cache. Some embodiments may further include determining whether any of the N plurality of processor caches are all in a low power state and disabling any of the N split snoop directories for which all of the plurality of processor caches are in a low power state.

Various embodiments may include a computing device configured to implement multiple split snoop directories. The computing device may include a first power domain including a plurality of processor caches, a second power domain including at least one processor cache, a coherent interconnect having a first split snoop directory for the first power domain and a second split snoop directory for the second power domain, and a first processing device communicatively connected to the first power domain and communicatively connected to the coherent interconnect. The first processing device may be configured to perform operations of the embodiment methods summarized above.

Various embodiments may include a computing device configured to implement multiple split snoop directories, the computing device having means for performing functions of the embodiment methods summarized above.

Various embodiments may include a non-transitory processor-readable storage medium having stored thereon processor-executable instructions configured to cause a processor of a computing device to perform operations of the embodiment methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

FIG. 6 is a table illustrating an example power state table for a power domain suitable for implementing an aspect.

DETAILED DESCRIPTION

Figure 1:
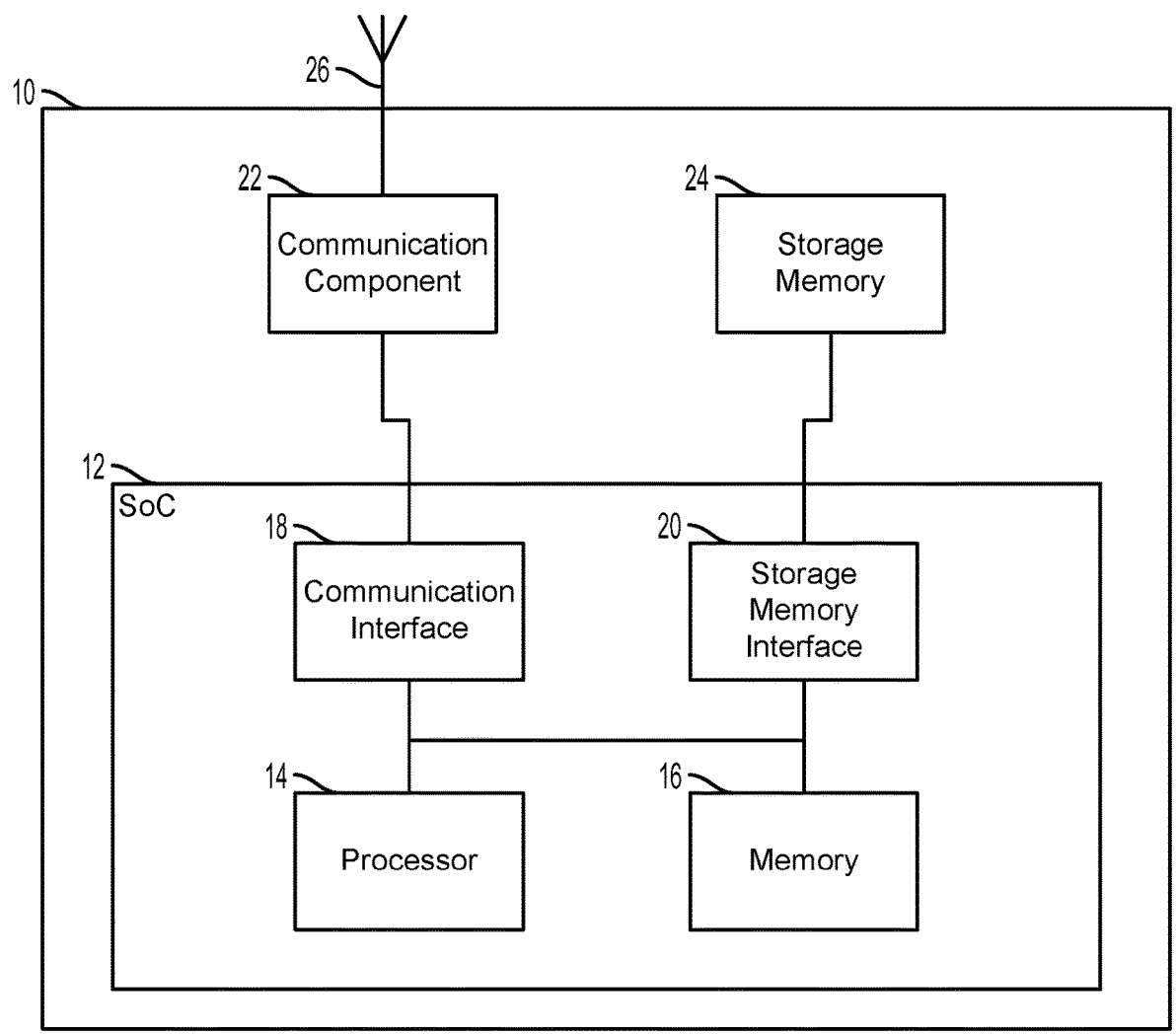
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects may include methods, and systems and devices implementing such methods for implementing power control of snoop directories using split snoop directory architectures for power domains having multiple processors, such as a central processing units (CPU). The multiple processors may be multicore processors. The apparatus and methods of the various aspects may include split snoop directory power control hardware for monitoring power domain power states and controlling split snoop directory power states for various snoop directories having split snoop directory architectures.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Realistic mobile device/smartphone use cases show that high performance multicore CPUs may be active less than 10% of the time in a typical day. High performance multicore CPUs also may have the biggest caches, which makes some of the most popular snoop directory architectures, such as a common tag or a statistical tag approach, very power inefficient in real use cases. These snoop directory architectures may service multiple multicore processors, including combinations of multicore processors of varying performance level. At any time, one or more of the multicore processors serviced by a snoop directory may be inactive while at least one the multicore processors serviced by the same snoop directory may be active. While any of the multicore processors serviced are active, the servicing snoop directory may not be powered down to conserve energy for a powered down multicore processor because the snoop directory may not be able to service the active multicore processor. Therefore, snoop directory architectures that service multiple multicore processors may be difficult to power scale. Snoop directory architectures that service individual multicore processors, such as a duplicate tag approach, may be more easily power scalable, because each snoop director may be powered down with the serviced multicore processor. However, one-to-one relationships between multicore processors and snoop directories may be very memory and power intensive.

A split snoop directory architecture may combine multiple snoop directories, referred to herein as split snoop directories. Each split snoop directory may be allocated for servicing one or more—but less than all—of the multicore processors. The multicore processors may be divided into power domains based on common characteristics of power consumption, including common levels and time of power consumption. In an example, a high performance multicore CPU, which is more often powered down than a standard multicore CPU, may be serviced by a first split snoop directory allocated only to the high performance multicore CPU or to multiple high performance multicore CPUs. In the same example, multiple standard multicore CPUs may be serviced by a second split snoop directory. The split snoop directories servicing a first power domain with multiple multicore processors, may use the common tag or the statistical tag approaches, while split snoop directories servicing a second power domain having only one multicore processor may use the duplicate tag, the common tag, or the statistical tag approaches. In an example, each multicore processor or group of multicore processors of a computing device may be its own power domain serviced by its own allocated split snoop directory using the common tag approach.

Split snoop directories may enable the ability to scale power based on multicore processor power states. In some aspects, one split snoop directory may be used for a power efficient power domain having one or more power efficient multicore processors, like standard performance multicore CPUs, and one split snoop directory may be used for the performance power domain having one or more performance multicore processors, like high performance multicore CPUs. For inclusive L2 cache, a single split snoop directory may be used. For exclusive L2 cache both duplicate tag and common tag options may be available. In some aspects, the common tag approach may be used for the split snoop directories to provide straight forward sizing of the split snoop directories, especially for inclusive L2 caches of the multicore processors; and to provide a reduced number of SRAM macros compared to the duplicate tag approach.

A split snoop directory power state may be tied to a power domain power state by hardware, making the power domain power state transparent to software. The power domain power state may include the power state of all of the multicore processors of the power domain. When a power domain is in a low power state, all of the multicore processors of the power domain also may be in a low power state.

Various multicore processors architectures manage power states differently. For example, a first multicore processor architecture may not provide any external indication of its power state and a second multicore processor architecture may provide a signal indicating its power state. For a first multicore processor architecture, a hardware implemented power domain low power monitor may be configured for different types of the first multicore processor architecture to detect whether a designated first multicore processor of a type of first multicore processor architecture may be in a low power state. The power domain low power monitor may monitor a power draw, a temperature, a multicore processor power control unit when the multicore processor is not indicating its power state, and/or input/output activity of the designated first multicore processor to determine the power state of the first multicore processor. In response to determining that the power domain is in a low power state, the power domain low power monitor may signal a split snoop directory power controller to power down the allocated split snoop directory of the power domain. Similarly, the power domain low power monitor may detect when the first multicore processor transitions to an active state (i.e., there is a change in the power domain), and signal the split snoop directory power controller to activate the allocated split snoop directory of the power domain in response.

As another example, in a second multicore processor architecture, the split snoop directory power controller may be configured for different types of the second multicore processor architecture to receive signals from a designated second multicore processor indicating whether the second multicore processor is in a low power state. Based on signals from the second multicore processor indicating whether it is in a low power state, a split snoop directory power controller may determine whether the power domain is in a low power state, and power down the allocated split snoop directory of the second multicore processor in response to determining the power domain is in the low power state. Similarly, the split snoop directory power controller may receive signals from a designated second multicore processor, and from those signals determine whether it is in an active state and activate the allocated split snoop directory of the power domain in response.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22 such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the necessary functions. Moreover, the computing device 10 may not be limited to one of each of the components, and multiple instances of each component may be included in various configurations of the computing device 10.

Figure 2:
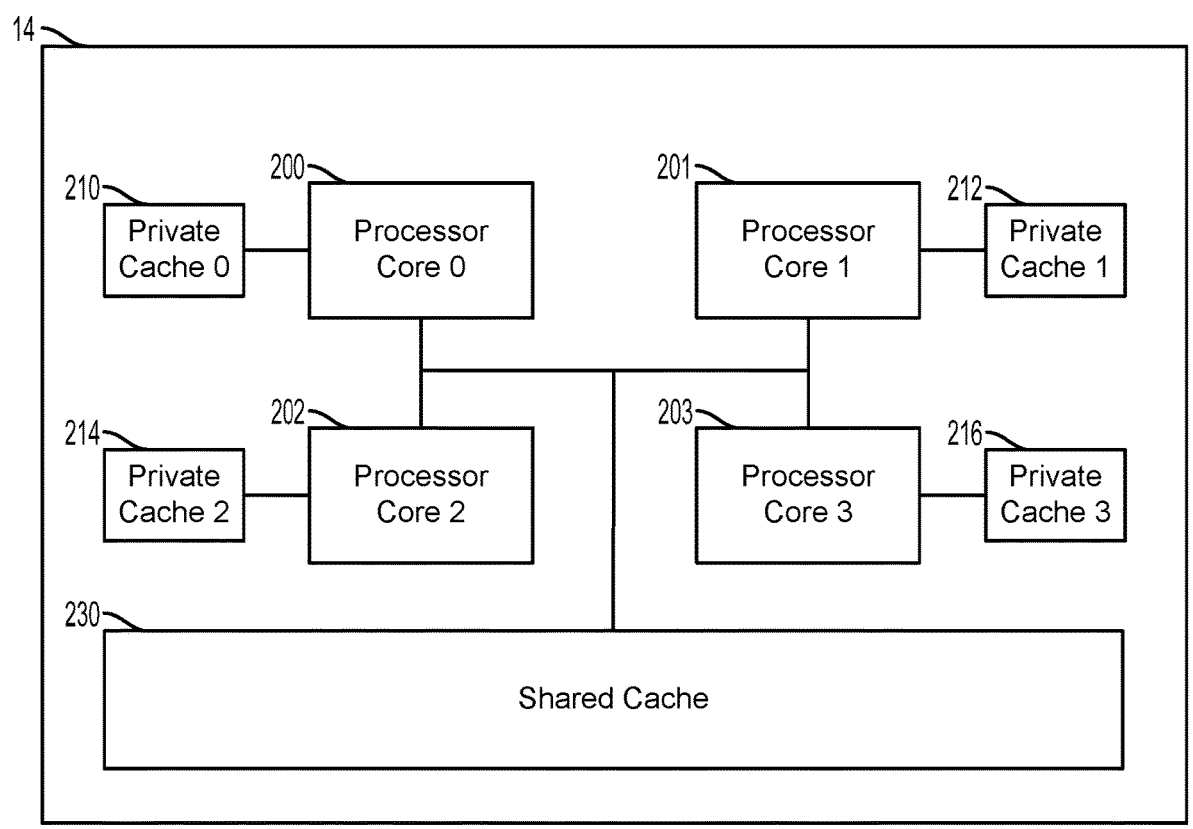
FIG. 2 is a component block diagram illustrating an example multicore processor suitable for implementing an aspect.

FIG. 2 illustrates a multicore processor suitable for implementing an aspect. The multicore processor 14 may include multiple processor types, including, for example, a central processing unit, a graphics processing unit, and/or a digital processing unit. The multicore processor 14 may also include a custom hardware accelerator which may include custom processing hardware and/or general purpose hardware configured to implement a specialized set of functions.

The multicore processor may have a plurality of homogeneous or heterogeneous processor cores 200, 201, 202, 203. A homogeneous multicore processor may include a plurality of homogeneous processor cores. The processor cores 200, 201, 202, 203 may be homogeneous in that, the processor cores 200, 201, 202, 203 of the multicore processor 14 may be configured for the same purpose and have the same or similar performance characteristics. For example, the multicore processor 14 may be a general purpose processor, and the processor cores 200, 201, 202, 203 may be homogeneous general purpose processor cores. The multicore processor 14 may be a graphics processing unit or a digital signal processor, and the processor cores 200, 201, 202, 203 may be homogeneous graphics processor cores or digital signal processor cores, respectively. The multicore processor 14 may be a custom hardware accelerator with homogeneous or heterogeneous processor cores 200, 201, 202, 203. For ease of reference, the terms "hardware accelerator," "custom hardware accelerator," "multicore processor," "processor," and "processor core" may be used interchangeably herein.

A heterogeneous multicore processor may include a plurality of heterogeneous processor cores. The processor cores 200, 201, 202, 203 may be heterogeneous in that the processor cores 200, 201, 202, 203 of the multicore processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous multicore processors 14. In various aspects, not all off the processor cores 200, 201, 202, 203 need to be heterogeneous processor cores, as a heterogeneous multicore processor may include any combination of processor cores 200, 201, 202, 203 including at least one heterogeneous processor core.

Each of the processor cores 200, 201, 202, 203 of a multicore processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The multicore processor 14 may further include a shared cache 230 that may be configured for read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the multicore processor 14. The shared cache 230 may include volatile memory as described herein with reference to memory 16 of FIG. 1.

In the example illustrated in FIG. 2, the multicore processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various aspects to a four-core processor system with four designated private caches. The computing device 10, the SoC 12, or the multicore processor 14 may individually or in combination include fewer or more than the four processor cores 200, 201, 202, 203 and private caches 210, 212, 214, 216 illustrated and described herein.

Figure 3:
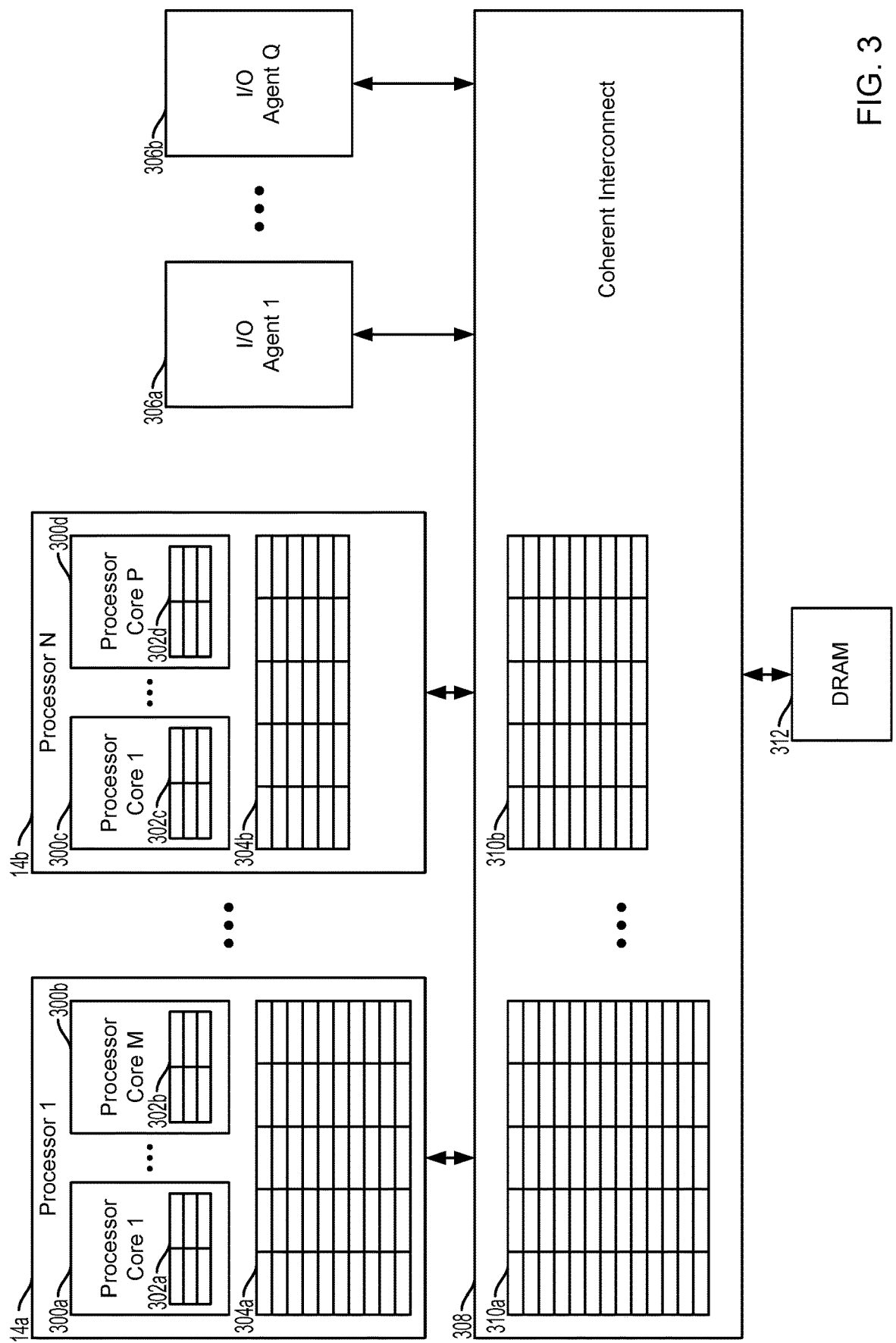
FIG. 3 is a block diagram illustrating an example of split snoop directory system for multiple power domains suitable for implementing an aspect.
Figure 4:
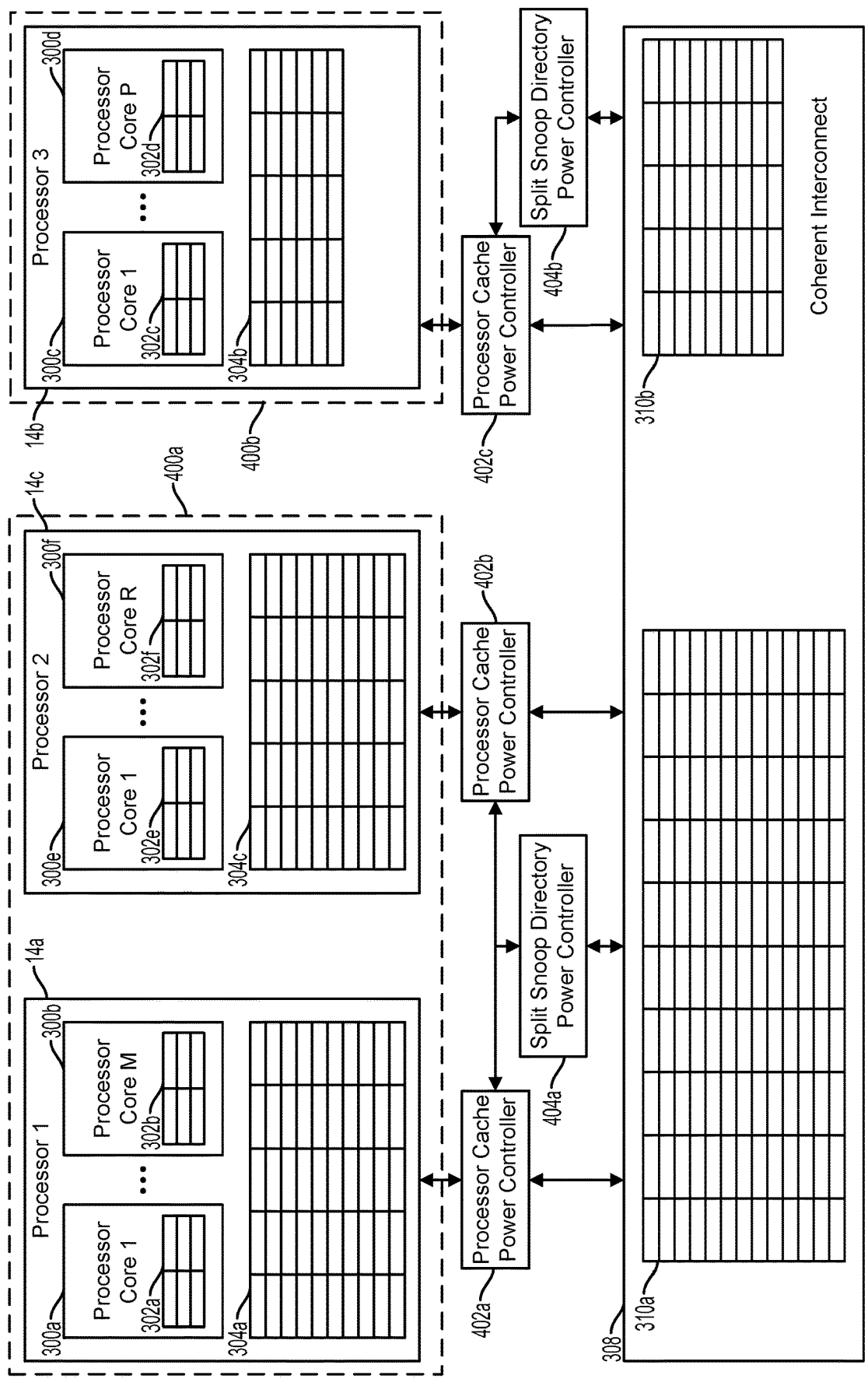
FIG. 4 is a block diagram illustrating an example of split snoop directory system for multiple power domains suitable for implementing an aspect.
Figure 5:
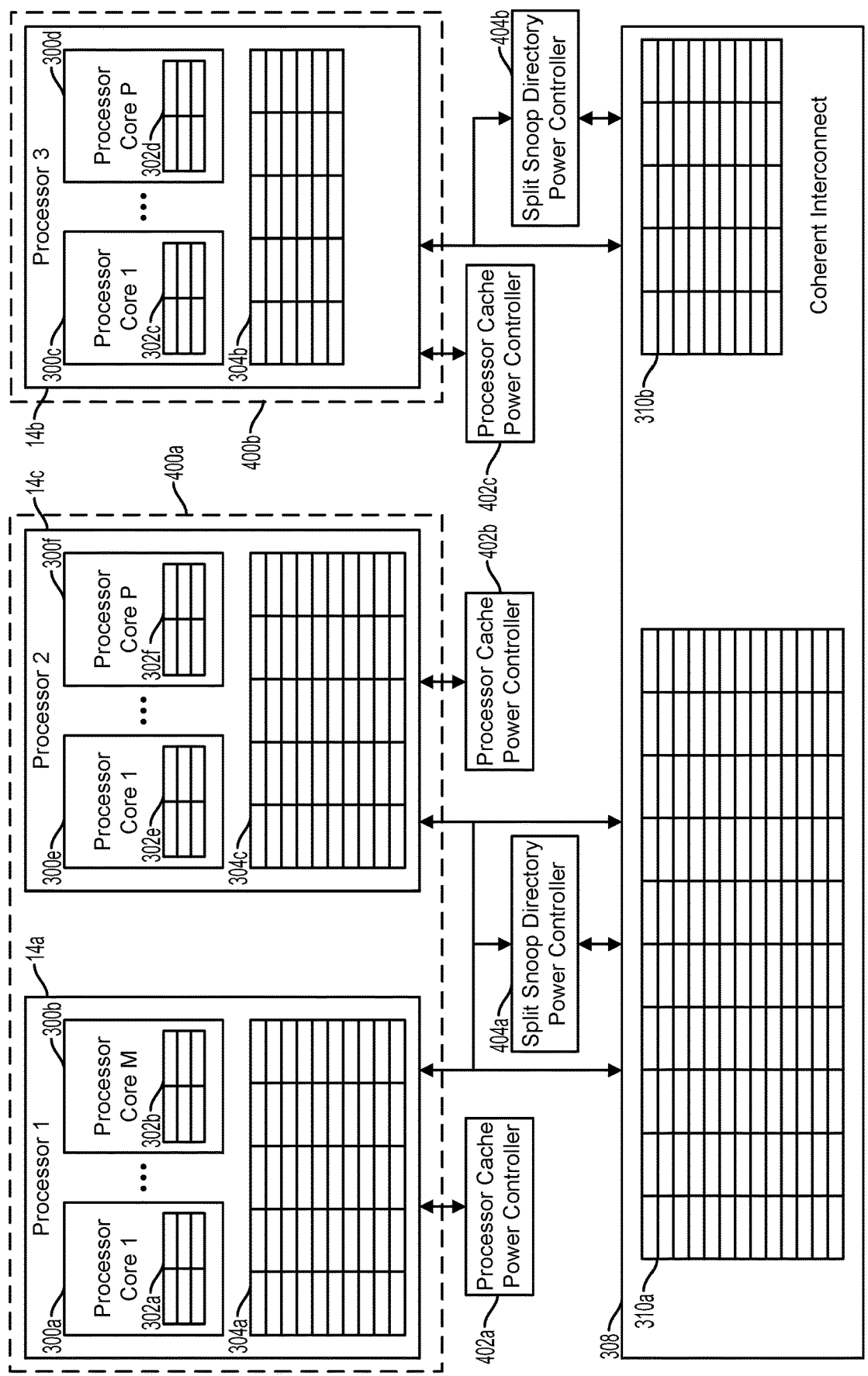
FIG. 5 is a block diagram illustrating an example of split snoop directory system for multiple power domains with multicore processor state signaling suitable for implementing an aspect.

FIGS. 3-5 illustrate non-limiting examples of split snoop directory systems for multiple power domains with and without multicore processor state signaling. The examples illustrated and described herein, particularly with reference to those of and relating to FIGS. 3-5, are non-limiting. The split snoop directory systems may include any number of processors, processor cores, private caches, shared caches, power domains, split snoop directories, processor cache power controllers, and split snoop directory power controllers. Thus, the number of processors, processor cores, caches, power domains, split snoop directories, shared cache controllers, and split snoop directory power controllers illustrated in the FIGS. 3-5 are merely for illustration. For ease of reference and clarity, the term multicore processor is used herein to refer to multicore processors, single core processors, and/or processor cores. Further, references to one or two power domains, split snoop directories, shared cashes, etc. in the descriptions of the various aspect methods are for illustration purposes only, as such methods may be extended to any number N of power domains, split snoop directories, shared cashes, etc.

FIG. 3 illustrates an example aspect of a split snoop directory system for multiple power domains. A computing device (e.g., the computing device 10 in FIG. 1) configured to implement a split snoop directory system may include at least two, but up to any integer number "N" multicore processors, for example, processor 1 14a and processor N 14b. Each multicore processor 14a, 14b may include any number of processor cores (e.g., processor cores 200, 201, 202, 203 in FIG. 2), for example, multicore processor 14a may include up to any integer number "M" processor cores, including processor core 1 300a and processor core M 300b. Similarly, multicore processor 14b may include up to any integer number "P" processor cores, including processor core 1 300c and processor core P 300d. As discussed herein, each of the multicore processors 14a, 14b may be homogenous and/or heterogeneous with respect to each other and/or among their respective processor cores 300a, 300b, 300c, 300d.

Each processor core 300a, 300b, 300c, 300d may be associated with a private cache (e.g., the private cache 210, 212, 214, 216 in FIG. 2) designated for use by the associated processor core 300a, 300b, 300c, 300d. For example, a private cache 302a may be associated with and designated for use by the processor core 300a. Similarly, a private cache 302b may be associated with and designated to the processor core 300b, a private cache 302c may be associated with and designated to the processor core 300c, and a private cache 302d may be associated with and designated to the processor core 300d.

Each multicore processor 14a, 14b may also include a shared cache (e.g., shared cache 230 in FIG. 2) configured for read and/or write access by the multicore processor 14a, 14b, including the processor cores 300a, 300b, 300c, 300d. In the example illustrated in FIG. 3, the multicore processor 14a may include a shared cache 304a, and the multicore processor 14b may include a shared cache 304b. In various aspects, the shared cache 304a, 304b may be writable only within its respective multicore processor 14a, 14b. In various aspects, the shared cache 304a, 304b may be readable by another multicore processor 14a, 14b using snooping.

A coherent interconnect 308 may be communicatively connected to the multicore processors 14a, 14b, any number of input/output (I/O) agents 306a, 306b, and any number of main memory or random access memory components 312 (e.g., memory 16 in FIG. 1). The coherent interconnect 308 may be configured to enable and control transmission of data between the various connected components. The I/O agents 306a, 306b may communicate input data to the coherent interconnect 308 with the multicore processors 14a, 14b and/or the random access memory components 312 as a destination for the data. The I/O agents 306a, 306b may also receive data from the multicore processors 14a, 14b and/or the random access memory components 312 through the coherent interconnect 308. The random access memory components 312 may be configured to store and/or provide data and/or instructions for the multicore processors 14a, 14b and/or the I/O agents 306a, 306b. The random access memory components 312 may be configured as a buffer for the data and/or instructions between the multicore processors 14a, 14b, the I/O agents 306a, 306b, and/or a storage device (e.g., storage memory 24 in FIG. 1).

The coherent interconnect 308 may also include random access memory components (e.g., memory 16 in FIG. 1, and static random access memory (SRAM)) configured to store and make available data representing the split snoop directories 310a, 310b. As described further herein, the split snoop directories 310a, 310b may be correlated with a particular power domain. Each split snoop directory 310a, 310b may include a number of tags corresponding with memory locations of the private caches 302a, 302b, 302c, 302d and/or the shared caches 304a, 304b of the respective multicore processors 14a, 14b of associated power domain. Each tag may be associated with information identifying whether certain data is located at a corresponding memory location of the private caches 302a, 302b, 302c, 302d and/or the shared caches 304a, 304b. The private caches 302a, 302b, 302c, 302d and/or the shared caches 304a, 304b may be referred to herein as a processor cache(s) for ease of reference and clarity of explanation. Use of the term processor cache(s) does not limit the aspects described herein to necessarily include all of the private caches 302a, 302b, 302c, 302d and/or the shared caches 304a, 304b.

The split snoop directory 310a, 310b may be queried by the multicore processors 14a, 14b and/or the I/O agents 306a, 306b to determine whether data sought for execution of a process is stored locally for a multicore processor 14a, 14b on its processor cache 302a, 302b, 302c, 302d, 304a, 304b, without having to query the processor cache 302a, 302b, 302c, 302d, 304a, 304b directly. When the data is not stored on the processor cache 302a, 302b, 302c, 302d, 304a, 304b, the query to either the split snoop directory 310a, 310b or the processor caches 302a, 302b, 302c, 302d, 304a, 304b is known as a "miss." Without implementation of the split snoop directory 310a, 310b, a snoop transaction by an issuing multicore processor 14a, 14b to each of the other multicore processors 14a, 14b is required to retrieve the data of the query. In response to a "miss" occurring, an external transaction to the random access memory components 312 is required to retrieve the data of the query. With implementation of the split snoop directory 310a, 310b, a snoop transaction to each of the other multicore processors 14a, 14b may not be required. Rather a snoop transaction may be directed to the split snoop directories 310a, 310b. In response to a "miss" occurring in the split snoop directories 310a, 310b, the external transaction to the random access memory components 312 may be implemented to retrieve the data of the query. In response to finding a tag in the split snoop directory 310a, 310b for a location in a processor cache 302a, 302b, 302c, 302d, 304a, 304b associated with the data for the query, also known as a "hit", a snoop transaction to all multicore processors 14a, 14b associated with the split snoop directory 310a, 310b that "hit" may be implemented. An external transaction to the random access memory components 312 might be implemented too (depending on access type, and snooped processor cache behavior).

Therefore, architectures that lack split snoop directories 310a, 310b may require extra transactions between the multicore processors 14a, 14b, the I/O agents 306a, 306b, the coherent interconnect 308, and the random access memory components 312 to retrieve the data of the query. Implementation of the split snoop directory 310a, 310b may allow a query directed to a split snoop directory 310a, 310b to be redirected to the random access memory components 312 for a "miss." This may obviate extra transactions between the coherent interconnect 308 and the multicore processors 14a, 14b otherwise needed to check for the data in the processor cache 302a, 302b, 302c, 302d, 304a, 304b. The query may be used to check whether a tag of the split snoop directory 310a, 310b indicates that the queried data is or is not stored locally to the multicore processor 14a, 14b on the processor cache 302a, 302b, 302c, 302d, 304a, 304b without implementing transactions between the coherent interconnect 308 and the multicore processors 14a, 14b. Upon indication of a "miss," the data may be retrieved from the random access memory components 312.

FIG. 4 illustrates an example aspect of a split snoop directory system for multiple power domains. The example illustrated in FIG. 4 incorporates many aspects of the example illustrated in FIG. 3, including the multicore processors 14a, 14b, the processor cores 300a, 300b, 300c, 300d, the private caches 302a, 302b, 302c, 302d, the shared caches 304a, 304b, the coherent interconnect 308, and the split snoop directories 310a, 310b. The example illustrated in FIG. 4 further includes components similar to those described above, including the multicore processor 14c, the processor cores 300e, 300f, the private caches 302e, 302f, and the shared cache 304c. The multicore processor 14c may include up to any integer number "R" processor cores, including processor core 1 300e and processor core R 300f. For clarity, the I/O agents 306a, 306b, and the random access memory components 312 are omitted from the example illustrated in FIG. 4. Also, the term processor cache(s) may include the additional private caches 302e, 302f, and the shared cache 304c of the example in FIG. 4.

The example illustrated in FIG. 4 also includes two power domains 400a, 400b, three processor cache power controllers 402a, 402b, 402c, and two split snoop directory power controllers 404a, 404b. The power domains 400a, 400b may be groups of at least one multicore processor 14a, 14b, 14c, and may include any number N of power domains. Each power domain 400a, 400b may include multiple processor cores 300a, 300b, 300c, 300d, 300e, 300f, and at least one shared cache 304a, 304b, 304c. The power domains 400a, 400b may also include any number of private caches 302a, 302b, 302c, 302d, 302e, 302f. Each of the power domains 400a, 400b may be associated with one of the split snoop directory 310a, 310b. In the example illustrated in FIG. 4, the power domain 400a may be associated with the split snoop directory 310a, and the power domain 400b may be associated with the split snoop directory 310b. In other words, the split snoop directory 310a may store tags corresponding to memory locations in the processor caches 302a, 302b, 302e, 302f, 304a, 304c, the split snoop directory 310b may store tags corresponding to memory locations in the processor cache 302c, 302d, 304b.

The processor cache power controllers 402a, 402b, 402c may be configured to detect conditions of the components of the power domains 400a, 400b in order to determine whether the components of the power domains are in or are transitioning between a low power state and a standard state. The processor cache power controllers 402a, 402b, 402c may monitor a power draw, a temperature, a multicore processor power control unit when the multicore processor is not indicating its power state, an interrupt, and/or input/output activity of a designated multicore processor 14a, 14b, 14c. The processor cache power controllers 402a, 402b, 402c may be configured to signal to an associated split snoop directory power controllers 404a, 404b, associated with the same the split snoop directory 310a, 310b and the power domain 400a, 400b. The processor cache power controllers 402a, 402b, 402c and the split snoop directory power controllers 404a, 404b may be associated in one-to-one relationships or many processor cache power controllers 402a, 402b, 402c to one split snoop directory power controller 404a, 404b. In various aspects, the number of processor cache power controllers 402a, 402b, 402c may be the same as the number of private caches 302a, 302b, 302c, 302d, 302e, 302f or shared caches 304a, 304b, 304c of the associated power domain 400a, 400b.

The split snoop directory power controllers 404a, 404b may be configured to track the power state of the components of the power domain 400a, 400b to which the split snoop directory power controller 404a, 404b is associated. The split snoop directory power controllers 404a, 404b may update the power state of the components of the power domain 400a, 400b based on the signals received from the processor cache power controllers 402a, 402b, 402c. As described further herein, the split snoop directory power controllers 404a, 404b may control a power state of the associated split snoop directory 310a, 310b based on the power state of the components of the power domain 400a, 400b. The split snoop directory power controllers 404a, 404b may power up and enable, power down and disable, or put in retention the associated split snoop directory 310a, 310b. In various aspects, each split snoop directory power controller 404a, 404b may be associated with one split snoop directory 310a, 310b.

FIG. 5 illustrates an example aspect of a split snoop directory system for multiple power domains. The example illustrated in FIG. 5 incorporates many aspects of the example illustrated in FIGS. 3 and 4, including the multicore processors 14a, 14b, 14c, the processor cores 300a, 300b, 300c, 300d, 300e, 300f, the processor caches including the private caches 302a, 302b, 302c, 302d, 302e, 302f, and the shared caches 304a, 304b, 304c, the coherent interconnect 308, the split snoop directories 310a, 310b, the power domains 400a, 400b, the processor cache power controllers 402a, 402b, 402c, and the split snoop directory power controllers 404a, 404b. For clarity, the I/O agents 306a, 306b and the random access memory components 312 are omitted from the example illustrated in FIG. 5.

In the example illustrated in FIG. 5 the multicore processors 14a, 14b, 14c, the processor cache power controllers 402a, 402b, 402c, and the split snoop directory power controllers 404a, 404b may be configured in a manner that differs from the example illustrated in FIG. 4. In various aspects, each multicore processors 14a, 14b, 14c may be configured to signal the processor's power state and the power state of the processor's components to the coherent interconnect 308 and to the split snoop directory power controllers 404a, 404b. The split snoop directory power controllers 404a, 404b may use the power state signals received from the multicore processors 14a, 14b, 14c to track the power states of the components of the power domains 400a, 400b. Therefore, the processor cache power controllers 402a, 402b, 402c may not need to be configured to detect conditions of the components of the power domains 400a, 400b in order to determine whether the components of the power domains are in or are transitioning between a low power state and a standard state.

In various aspects, the split snoop directory power controllers 404a, 404b may be configured as described with reference to FIG. 4, except instead of using the signals from the processor cache power controllers 402a, 402b, 402c, the split snoop directory power controllers 404a, 404b may track the power state of the components of the power domains 400a, 400b and control the power states of the split snoop directories 310a, 310b based on signals received from the multicore processors 14a, 14b, 14c.

FIG. 6 illustrates an example power state table 600 for a power domain (e.g., power domain 400a, 400b in FIGS. 4 and 5). A power state table 600 may include various rules for the split snoop directory power controllers (e.g., split snoop directory power controllers 404a, 404b in FIGS. 4 and 5) for controlling the power state of an associated split snoop directory (e.g., split snoop directory 310a, 310b in FIGS. 3-5) according to the power states of the components of the power domain. The example illustrated in FIG. 6 includes two columns for the power states of the processor caches (e.g., private caches 302a, 302b, 302c, 302d, 302e, 302f and shared cache 304a, 304b, 304c in FIGS. 3-5) of two multicore processors (e.g., multicore processors 14a, 14b, 14c in FIGS. 3-5). For clarity and simplicity, the example illustrated in FIG. 6 shows two columns for the power states of two processor caches (e.g., the shared caches) of two multicore processors of a single power domain. However, this example is non-limiting, and a power state table for use with various aspects may include any number of columns used to track any number of processor caches, multicore processors, or power domains.

In various aspects, as long as at least one processor cache is in a high power state, such as an "ON" power state, the corresponding split snoop directory associated with the power domain having the "ON" processor cache may also be set to an "ON" power state. In various aspects, for a split snoop directory to be set to a low power state, such as an "OFF" power state, all of the processor caches of the associated power domain may be in an "OFF" power state. Because the split snoop directory is shared by multiple processor caches of a power domain, the split snoop directory may be powered to be able to service any portion of the power domain. Therefore, to be able to power off the split snoop directory, all of the processor caches of the power domain may need to be powered off so that there is no need for the split snoop directory to service any portion of the power domain.

In various aspects, in any combination of processor caches of a power domain being in various combinations of low power states including an "OFF" state and at least one of the processor caches being in a "RET" (retention) state, the split snoop directory for the power domain may be set to a "RET" state. Because retention of data requires power (albeit lower power than an "ON" state), the split snoop directory may be placed in a "RET" state to correspond with the at least one processor cache in the "RET" state while other processor caches of the power domain are powered off. Similar to the combination of "ON" state and "OFF" state processor caches, for any combination of at least one processor cache being in an "ON" state and any other processor caches being in "RET" and/or "OFF" states, the split snoop directory may be set to an "ON" state. In each of these combinations of power states, the higher power state of at least one processor cache of a power domain may dictate the power state of the split snoop directory; "ON" being the highest power state, then "RET", and "OFF" being the lowest power state. The split snoop directory power controllers may be configured to track the power states of the components of the power domains with which they are associated, and apply rules, such as the rules in the example illustrated in FIG. 6, to control the power states of the split snoop directories.

Various aspects include methods 700, 800, 900, 1000, 1100, 1200, 1300, 1400, 1500 that may be implemented by one or more processors for multiple power domains and multiple split snoop directories as illustrated in FIGS. 7-15 and described below. The methods 700, 800, 900, 1000, 1100, 1200, 1300, 1400, 1500 may be implemented individually and/or in parallel for multiple power domains (e.g., power domain 400a, 400b in FIGS. 4 and 5) and their corresponding split snoop directories (e.g., split snoop directory 310a, 310b in FIGS. 4 and 5). The multiple power domains may each include any combination of components, including a multicore processor (e.g., multicore processor 14a, 14b, 14c in FIGS. 4 and 5), a processor core (e.g., processor core 300a, 300b, 300c, 300d, 300e, 300f in FIGS. 4 and 5), and at least one processor cache including a private cache (e.g., private cache 302a, 302b, 302c, 302d, 302e, 302f in FIGS. 4 and 5) and/or a shared cache (e.g., shared cache 304a, 304b, 304c in FIGS. 4 and 5). For example, a first power domain may include multiple processor caches and a second power domain may include at least one processor cache. As described herein, each power domain may be associated with a corresponding split snoop directory. For example, the first power domain may be associated with a first split snoop directory and the second power domain may be associated with a second split snoop directory. For clarity and ease of reference, the methods 700, 800, 900, 1000, 1100, 1200, 1300, 1400, 1500 are described herein with reference to the first power domain and the first split snoop directory. However, the methods 700, 800, 900, 1000, 1100, 1200, 1300, 1400, 1500 may be similarly implemented for the second power domain and the second split snoop directory and/or any number N power domains and N split snoop directories, in which N is an integer greater than 1. Further, the aspect methods 700, 800, 900, 1000, 1100, 1200, 1300, 1400, 1500 may be implemented for N power domains and N split snoop directories individually or in parallel.

Figure 7:
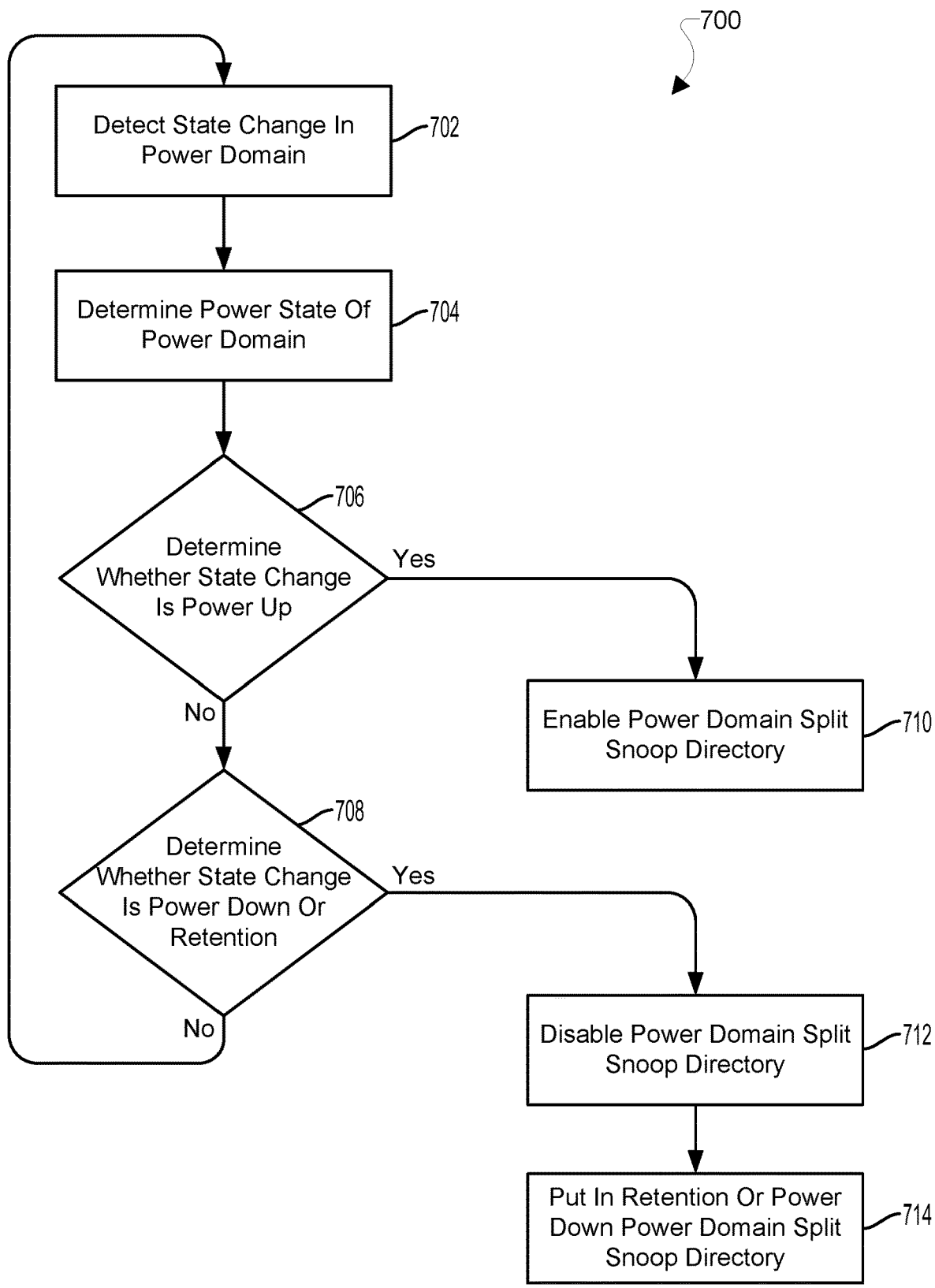
FIG. 7 is a process flow diagram illustrating a method for implementing split snoop directories for multiple power domains according to an aspect.

FIG. 7 illustrates a method 700 for implementing split snoop directories for multiple power domains according to an aspect. The method 700 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a software-configured processor and dedicated hardware, such as a processor executing software within a split snoop directory system that includes other individual components. In order to encompass the alternative configurations enabled in the various aspects, the hardware implementing the method 700 is referred to herein as a "processing device."

In block 702, the processing device may monitor for and detect a power state change in a first power domain (e.g., power domain 400a, 400b in FIGS. 4 and 5). In various aspects, monitoring for and detecting a power state change in a first power domain may include directly monitoring for and detecting a power state change, or monitoring for and detecting a condition for changing a power state. In various aspects, the power state change or condition for changing a power state may be detected for any of the components of the first power domain, including a multicore processor (e.g., multicore processor 14a, 14b, 14c in FIGS. 4 and 5), a processor core (e.g., processor core 300a, 300b, 300c, 300d, 300e, 300f in FIGS. 4 and 5), and a processor cache including a private cache (e.g., private cache 302a, 302b, 302c, 302d, 302e, 302f in FIGS. 4 and 5) or a shared cache (e.g., shared cache 304a, 304b, 304c in FIGS. 4 and 5). The power state change detected may include a change from any of the high power state, such as the "ON" state, and the lower power states, such as the "OFF" or "RET" states, to another power state of the same set of power states. In some aspects, the processing device may monitor a power state of N power domains. For ease of reference, the method 700 is described with respect to the processor monitoring and detecting a power state of one ("first") power domain. However, the reference to the first power domain is arbitrary and non-limiting because similar operations may be performed for any number N of power domains.

In block 704, the processing device may determine a power state of the first power domain. The power state of the first power domain may be linked to the power state of any combination of the components of the first power domain. For example, the power state of the first power domain may be linked to the power state of the processor caches of the first power domain. As discussed herein, the power state for the first power domain may be the highest power state of any one of the components to which the power state of the first power domain is linked. In some aspects, the processing device may determine a power state of N power domains.

In determination block 706, the processing device may determine whether the power state change is a power up state change for the first power domain. A power up state change may include a change from a low power state, including an "OFF" or "RET" power state, to a high power state, including an "ON" power state. The processing device may compare the state of the first power domain and the power state change in the first power domain to determine whether there is a state change for the first power domain and what the state change is. For example, a power state change in the first power domain to a higher power state than the first power domain may result in a state change for the first power domain to the higher power state. In another example, a power state change in the first power domain to a lower power state than the first power domain may result in a state change for the first power domain to the lower power state, as long as no other component of the first power domain is in a higher power state than the power state of the power state change. In another example, a power state change in the first power domain to a power state that is the same as the power state for the first power domain may result in no power state change for the first power domain. In some aspects, the processing device may perform the operations in determination block 706 for N power domains.

In response to determining that the power state change is a power up state change for the first power domain (i.e., determination block 706="Yes"), the processing device may enable the first split snoop directory (e.g., split snoop directory 310a, 310b in FIGS. 3-5) corresponding to the first power domain in block 710. In some aspects, the processing device may perform the operations in block 710 for N power domains.

In response to determining that the power state change is not a power up state change for the first power domain (i.e., determination block 706="No"), the processing device may determine whether the power state change is a power down or retention state change for the first power domain in determination block 708. The "OFF" and "RET" power states may be referred to as low power states, and a power state change including a power down or retention state change may be a change to a low power state. In some aspects, the processing device may perform the operations in block 708 for N power domains.

In response to determining that the power state change is a power down or retention state change for the first power domain (i.e., determination block 708="Yes"), the processing device may disable the first split snoop directory corresponding to the first power domain in block 712. In some aspects, the processing device may perform the operations in block 712 for N power domains.

In block 714, the processing device may put the first split snoop directory into a retention state or power down the first split snoop directory depending on whether the power state change is a power down or retention state change for the first power domain in determination block 708. In some aspects, the processing device may perform the operations in block 714 for N power domains.

In response to determining that the power state change is not a power down or retention state change for the first power domain (i.e., determination block 708="No"), the processing device may continue to monitor for and detect a further power state change in the first power domain (or N power domains) in block 702.

Figure 8:
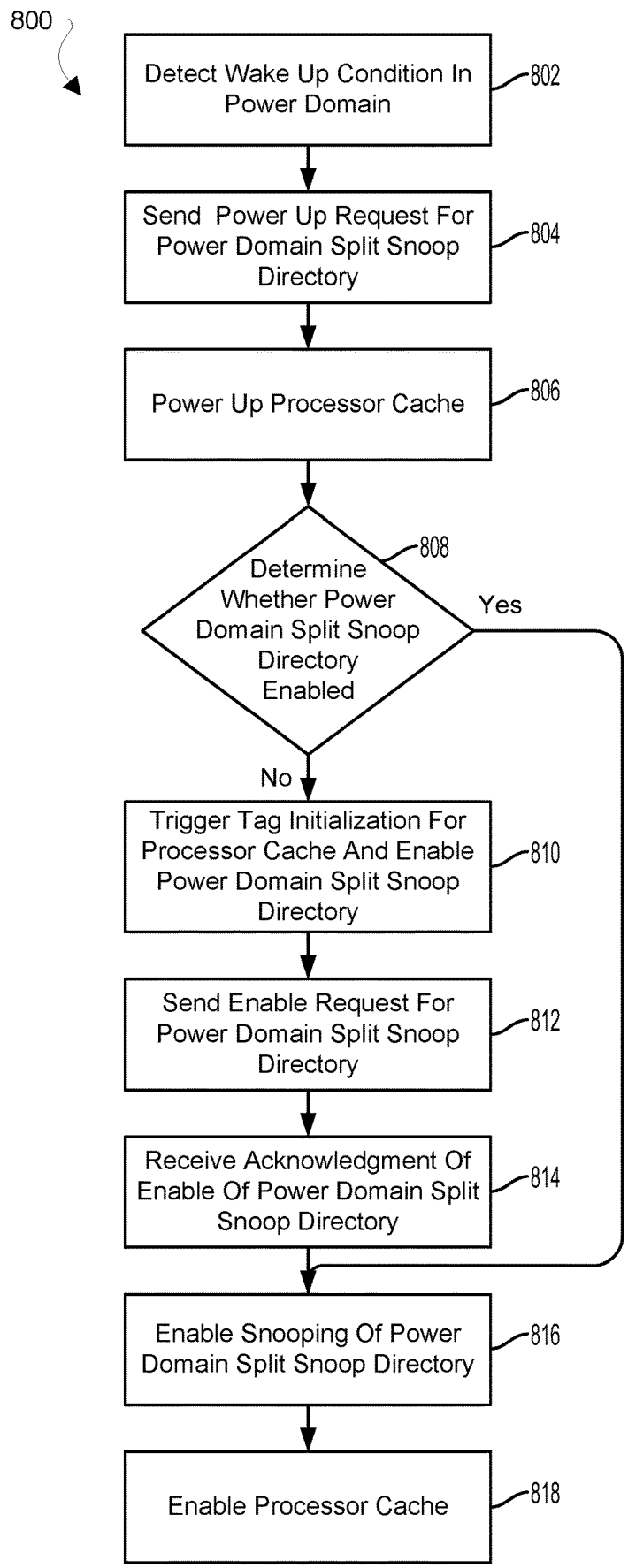
FIG. 8 is a process flow diagram illustrating a method for implementing split snoop directory power up and enablement for multiple power domains according to an aspect.

FIG. 8 illustrates a method 800 for implementing split snoop directory power up and enablement for multiple power domains according to an aspect. The method 800 may be implemented for any number N power domains in which N is an integer greater than 1. The method 800 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a processor and dedicated hardware, such as a processor executing software within a split snoop directory system that includes other individual components. In order to encompass the alternative configurations enabled in the various aspects, the hardware implementing the method 800 is referred to herein as a "processing device." In various aspects, the method 800 may be implemented as part of, in extension of, in conjunction with, or separate from the method 700 described with reference to FIG. 7.

In block 802 the processing device may detect a wake up condition in a first power domain (e.g., power domain 400a, 400b in FIGS. 4 and 5). A wake up condition may be a condition for changing the first power domain to a high power (i.e., "ON") state. Detecting a wake up condition may be based on monitoring a power draw, a temperature, a multicore processor power control unit activity and/or state when the multicore processor is not indicating its power state, an interrupt, and/or input/output activity of a component of the first power domain, including any of a multicore processor (e.g., multicore processor 14a, 14b, 14c in FIGS. 4 and 5), a processor core (e.g., processor core 300a, 300b, 300c, 300d, 300e, 300f in FIGS. 4 and 5), and a processor cache including a private cache (e.g., private cache 302a, 302b, 302c, 302d, 302e, 302f in FIGS. 4 and 5) or a shared cache (e.g., shared cache 304a, 304b, 304c in FIGS. 4 and 5). An increase in a monitored level of power draw, temperature, and/or input/output activity, detecting the multicore processor power control unit's activity and/or state, and/or detecting an interrupt may indicate to the processing device that a wake up event has occurred in the first power domain. In some aspects, the processing device may perform the operations in block 802 for N power domains.

In block 804, the processing device may send a power up request for the first split snoop directory (e.g., split snoop directory 310a, 310b in FIGS. 3-5) for the first power domain. The power up request for the first split snoop directory for the first power domain may be sent after a determination of a power up state change for the first power domain, such as in determination block 706 of the method 700, or irrespective of such a determination. In some aspects, the processing device may perform the operations in block 804 for N power domains.

In block 806, the processing device may power up a multicore processor cache in response to detecting the wake up condition. In some aspects, the processing device may perform the operations in block 806 for N power domains.

In block 808, the processing device may determine whether the first split snoop directory associated with the first power domain is enabled. In some aspects, the processing device may perform the operations in block 808 for N power domains and N split snoop directories.

In determination block 810, the processing device may trigger tag initialization for the first split snoop directory associated with the first power domain, and trigger enabling the first split snoop directory. In some aspects, the processing device may perform the operations in block 810 for N power domains and N split snoop directories.

In response to determining that the first snoop director associated with the first power domain is not enabled (i.e., determination block 810="No"), the processing device may send an enable request for the first split snoop directory in block 812. In some aspects, the processing device may perform the operations in block 812 for N power domains and N split snoop directories.

In block 814, the processing device may receive an acknowledgment of enablement of the first split snoop directory. In some aspects, the processor may receive acknowledgement of enablement in block 810 for N split snoop directories.

In block 816, the processing device may enable snooping of the first split snoop directory. In some aspects, the processing device may perform the operations in block 816 for N power domains and N split snoop directories.

In block 818, the processing device may enable the multicore processor cache.

In response to determining that the first split snoop director associated with the first power domain is enabled (i.e., determination block 810="Yes"), the processing device may enable snooping of the first split snoop directory in block 816. In some aspects, the processing device may perform the operations in block 810 for N power domains and N split snoop directories.

Figure 9:
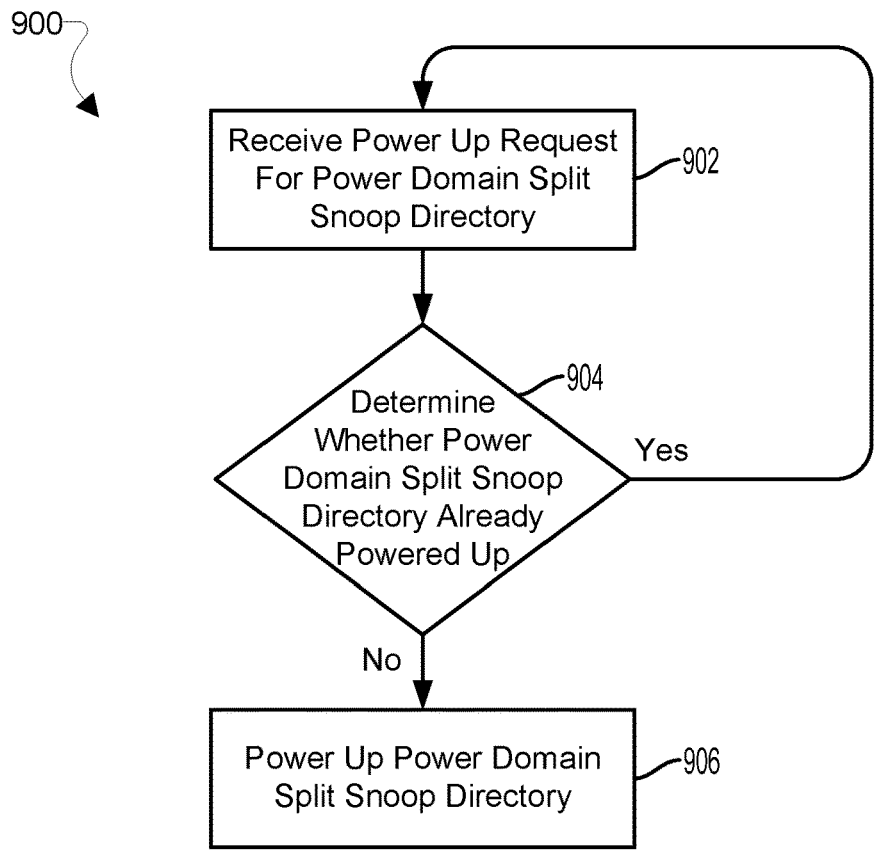
FIG. 9 is a process flow diagram illustrating a method for implementing split snoop directory power up for multiple power domains according to an aspect.

FIG. 9 illustrates a method 900 for implementing split snoop directory power up for multiple power domains according to an aspect. The method 900 may be implemented for any number N power domains in which N is an integer greater than 1. The method 900 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a processor and dedicated hardware, such as a processor executing software within a split snoop directory system that includes other individual components. In order to encompass the alternative configurations enabled in the various aspects, the hardware implementing the method 900 is referred to herein as a "processing device." In various aspects, the method 900 may be implemented as part of, in extension of, in conjunction with, or separate from the method 700 in FIG. 7 and/or the method 800 described with reference to FIG. 8.

In block 902, the processing device may receive a power up request for a first split snoop directory (e.g., split snoop directory 310a, 310b in FIGS. 3-5) associated with a first power domain (e.g., power domain 400a, 400b in FIGS. 4 and 5). The power up request may be the power up request sent in block 804 of the method 800. In some aspects, the processor may perform the operations in block 902 for N power domains and N split snoop directories.

In determination block 904, the processing device may determine whether the first split snoop directory associated with the first power domain is already powered up. In some aspects, the processing device may perform the operations in block 904 for N power domains and N split snoop directories.

In response to determining that the first split snoop directory is not already powered up (i.e., determination block 904="No"), the processing device may power up the first split snoop directory in block 906. In some aspects, the processing device may perform the operations in block 906 for N power domains and N split snoop directories.

In response to determining that the first split snoop directory is already powered up (i.e., determination block 904="Yes"), the processing device may receive a power up request for a second split snoop directory associated with a second power domain in block 902.

Figure 10:
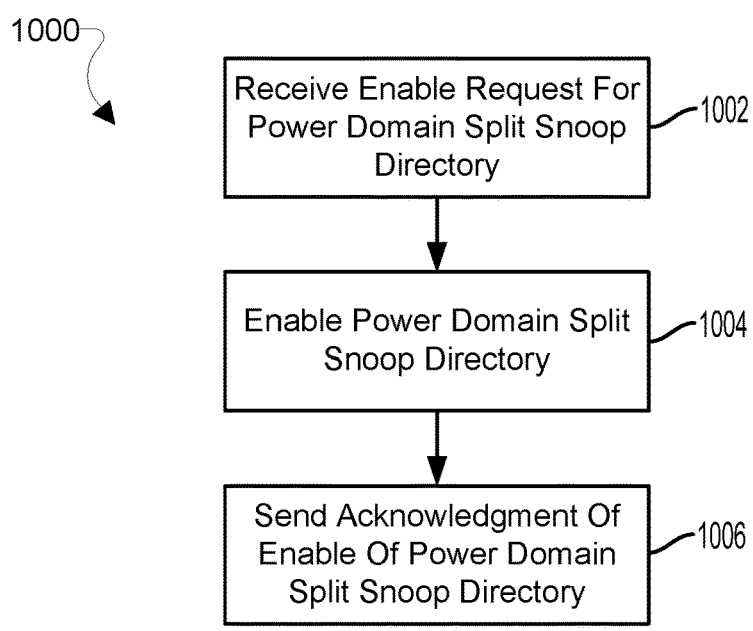
FIG. 10 is a process flow diagram illustrating a method for implementing split snoop directory enablement for multiple power domains according to an aspect.

FIG. 10 illustrates a method 1000 for enabling the split snoop directory for multiple power domains according to an aspect. The method 1000 may be implemented for any number N power domains in which N is an integer greater than 1. The method 1000 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a processor and dedicated hardware, such as a processor executing software within a split snoop directory system that includes other individual components. In order to encompass the alternative configurations enabled in the various aspects, the hardware implementing the method 1000 is referred to herein as a "processing device." In various aspects, the method 1000 may be implemented as part of, in extension of, in conjunction with, or separate from the method 700 described with reference to FIG. 7 and/or the method 800 described with reference to FIG. 8.

In block 1002, the processing device may receive an enable request for a first split snoop directory (e.g., split snoop directory 310a, 310b in FIGS. 3-5) associated with a first power domain (e.g., power domain 400a, 400b in FIGS. 4 and 5). The enable request may be the enable request sent in block 812 of the method 800. In some aspects, the processing device may perform the operations in block 1002 for N power domains and N split snoop directories.

In block 1004, the processing device may enable the first split snoop directory. In block 1006, the processing device may send an acknowledgement of the enablement of the power domain split snoop directory. The acknowledgement may be the acknowledgement received in block 814 of the method 800.

Figure 11:
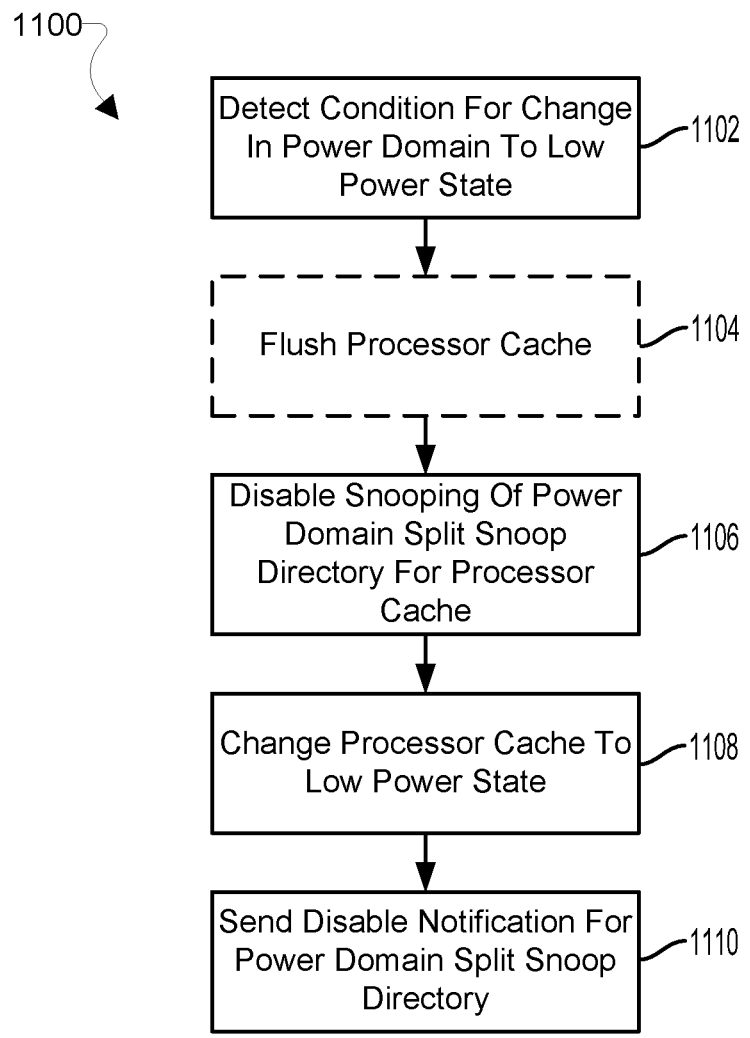
FIG. 11 is a process flow diagram illustrating a method for implementing split snoop directory disabling for multiple power domains according to an aspect.

FIG. 11 illustrates a method 1100 for implementing split snoop directory disabling for multiple power domains according to an aspect. The method 1100 may be implemented for any number N power domains in which N is an integer greater than 1. The method 1100 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a processor and dedicated hardware, such as a processor executing software within a split snoop directory system that includes other individual components. In order to encompass the alternative configurations enabled in the various aspects, the hardware implementing the method 1100 is referred to herein as a "processing device." In various aspects, the method 1100 may be implemented as part of, in extension of, in conjunction with, or separate from the method 700 in FIG. 7.

In block 1102, the processing device may detect a condition for change in a first power domain (e.g., power domain 400a, 400b in FIGS. 4 and 5) to a low power state including, power down and retention (i.e., RET) states. Detecting a power down (i.e., "OFF") or retention (i.e., "RET") condition may be based on monitoring a power draw, a temperature, a multicore processor power control unit activity and/or state when the multicore processor is not indicating its power state, and/or input/output activity of a component of the first power domain, including any of a multicore processor (e.g., multicore processor 14a, 14b, 14c in FIGS. 4 and 5), a processor core (e.g., processor core 300a, 300b, 300c, 300d, 300e, 300f in FIGS. 4 and 5), and processor cache including a private cache (e.g., private cache 302a, 302b, 302c, 302d, 302e, 302f in FIGS. 4 and 5) or a shared cache (e.g., shared cache 304a, 304b, 304c in FIGS. 4 and 5). A decrease or cessation in a monitored level of power draw, temperature, a multicore processor power control unit's activity and/or state, and/or input/output activity may indicate to the processing device that a power down or retention event has occurred in the first power domain. In some aspects, the processing device may perform the operations in block 1102 for N power domains.

In optional block 1104, for a power down event, the processing device may flush the processor caches of the first power domain affected by the power down event. The processor cache flush may transmit the data stored in the processor cache at the time of the power down event to another memory (e.g., memory 16 and storage device 24 in FIG. 1 and random access memory components 312 in FIG. 3). In some aspects, the processing device may perform the operations in block 1104 for N power domains and N split snoop directories.

In block 1106, the processing device may disable snooping of a first split snoop directory associated with the first power domain for the processor caches associated with the change to a low power state. In some aspects, the processing device may perform the operations in block 1106 for N power domains and N split snoop directories.

In block 1108, the processing device may change the processor caches of the first power domain, associated with the change to a low power state, to the low power state. In various embodiments, changing a processor cache to a low power state may include changing the processor cache to a powered down (i.e., "OFF") state or to a retention (i.e., "RET") state.

In block 1110, the processing device may send a disable notification for the first split snoop directory associated with the first power domain. The disable notification may be a request to change the first split snoop directory to a low power state, such as the "OFF" or the "RET" state, in response to detecting the condition for changing a first power domain to a low power state in block 1102. In some aspects, the processing device may perform the operations in block 1108 for N power domains and N split snoop directories.

Figure 12:
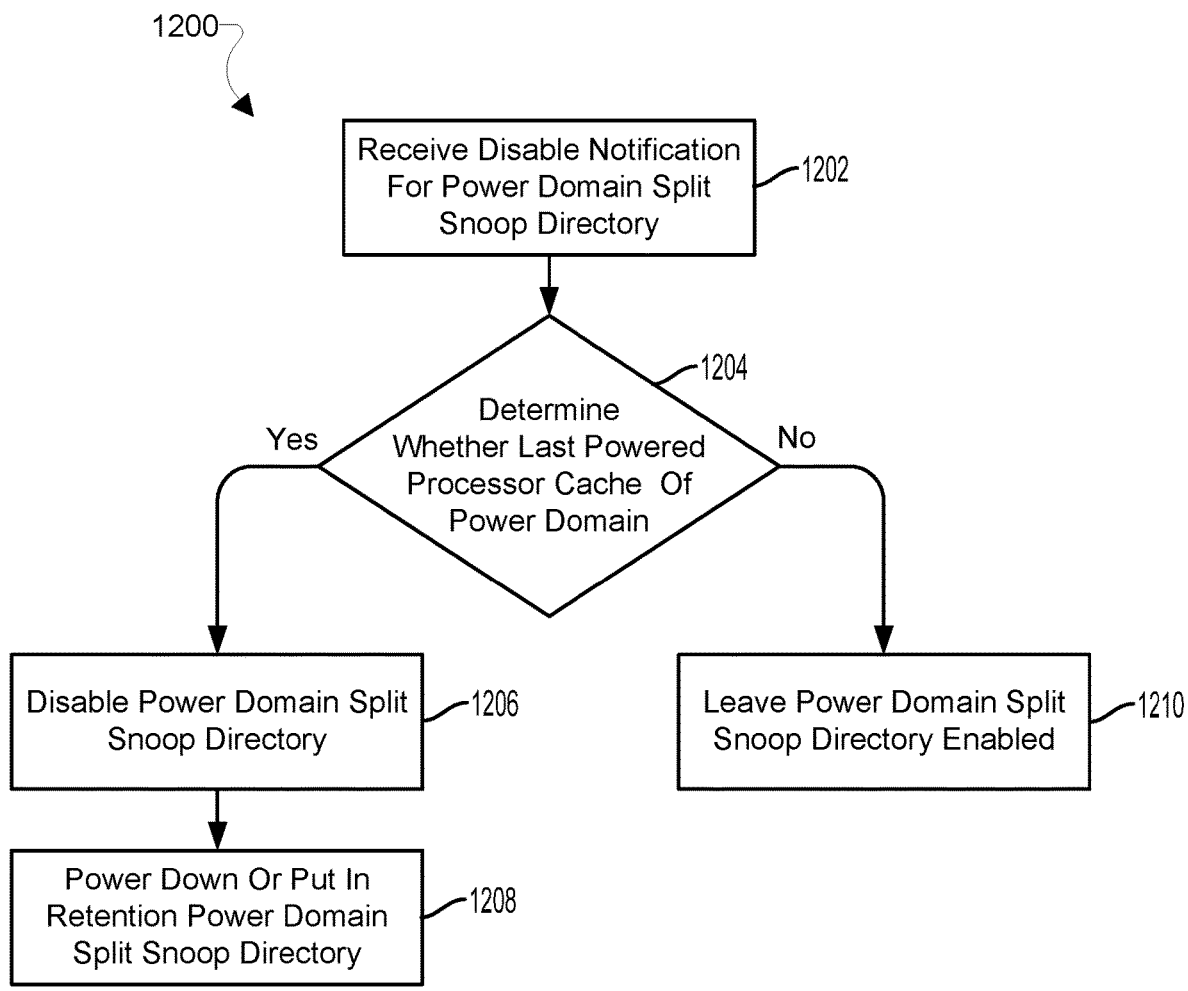
FIG. 12 is a process flow diagram illustrating a method for implementing split snoop directory disabling for multiple power domains according to an aspect.

FIG. 12 illustrates a method 1200 for implementing split snoop directory disabling for multiple power domains according to an aspect. The method 1200 may be implemented for any number N power domains in which N is an integer greater than 1. The method 1200 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a processor and dedicated hardware, such as a processor executing software within a split snoop directory system that includes other individual components. In order to encompass the alternative configurations enabled in the various aspects, the hardware implementing the method 1200 is referred to herein as a "processing device." In various aspects, the method 1200 may be implemented as part of, in extension of, in conjunction with, or separate from the method 700 described with reference to FIG. 7 and/or the method 1100 described with reference to FIG. 11.

In block 1202, the processing device may receive a disable notification for a first split snoop directory (e.g., split snoop directory 310a, 310b in FIGS. 3-5) associated with a first power domain (e.g., power domain 400a, 400b in FIGS. 4 and 5). The disable notification may be the disable notification sent in block 1110 of the method 1100. The disable notification may be a request to change the first split snoop directory to a low power state, such as the "OFF" or the "RET" state, in response to detecting the condition for changing a first power domain to a low power state in block 1102. In some aspects, the processing device may perform the operations in block 1202 for N power domains and N split snoop directories.

In block determination block 1204, the processing device may determine whether the disable notification is triggered by changing a last powered processor cache (e.g., private cache 302a, 302b, 302c, 302d, 302e, 302f or shared cache 304a, 304b, 304c in FIGS. 4 and 5) of the first power domain to a low power state, either by powering down the last powered processor cache into retention or putting the last powered processor cache into retention. In other words, the processor may determine whether changing the processor cache to a low power state in block 1108 of the method 1100 results in all of the processor caches of the first power domain in an "OFF" or "RET" power state and none in an "ON" power state. In some aspects, the processing device may perform the operations in determination block 1204 for N power domains.

In response to determining that the disable notification is triggered by changing the last powered processor cache to a low power state (i.e., determination block 1204="Yes"), the processing device may disable the first split snoop directory associated with the first power domain in block 1206. In some aspects, the processing device may perform the operations in block 1206 for N power domains and N split snoop directories.

In block 1208, the processing device may power down or put into retention the first split snoop directory associated with the first power domain. In some aspects, the processing device may perform the operations in block 1208 for N power domains and N split snoop directories.

In response to determining that the disable notification is triggered by changing the not last powered processor cache to a low power state (i.e., determination block 1204="No"), the processing device may leave the first split snoop directory enabled in block 1210. In some aspects, the processing device may perform the operations in block 1210 for N power domains and N split snoop directories.

In the methods 700, 800, 900, 1000, 1100, 1200 described herein, the transmission (i.e., sending and receiving) of signals, requests, and acknowledgements may occur between the split snoop directory power controllers (e.g., the split snoop directory power controllers 404a, 404b in FIGS. 4 and 5) and the processor cache power controllers (e.g., the processor cache power controllers 402a, 402b, 402c in FIGS. 4 and 5) associated with a power domain (e.g., the power domain 400a, 400b in FIGS. 4 and 5).

Figure 13:
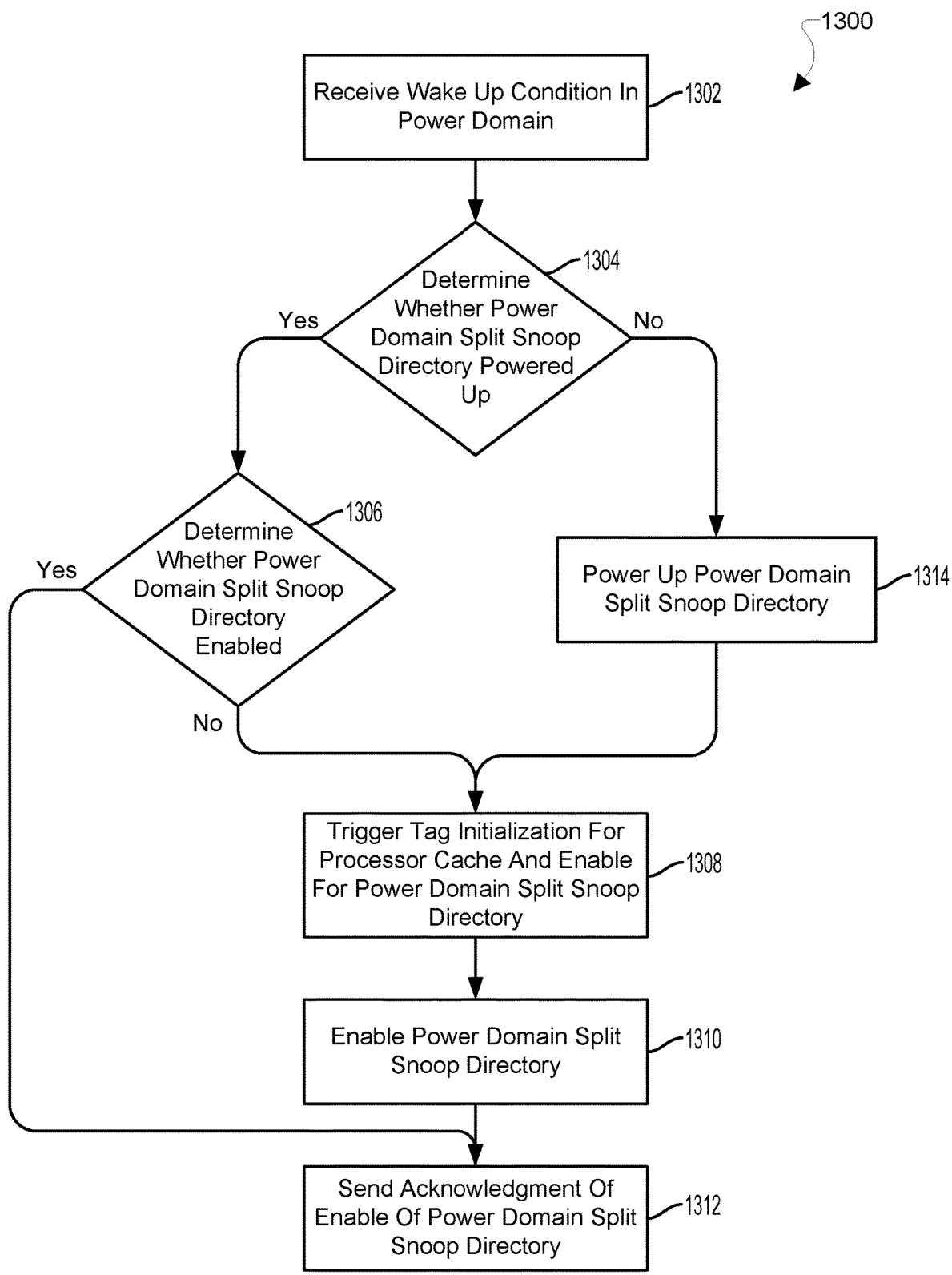
FIG. 13 is a process flow diagram illustrating a method for implementing split snoop directory power up and enablement for multiple power domains with multicore processor state signaling according to an aspect.

FIG. 13 illustrates a method 1300 for implementing split snoop directory power up and enablement for multiple power domains with multicore processor state signaling according to an aspect. The method 1300 may be implemented for any number N power domains in which N is an integer greater than 1. The method 1300 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a processor and dedicated hardware, such as a processor executing software within a split snoop directory system that includes other individual components. In order to encompass the alternative configurations enabled in the various aspects, the hardware implementing the method 1300 is referred to herein as a "processing device." In various aspects, the method 1300 may be implemented as part of, in extension of, in conjunction with, or separate from the method 700 described with reference to FIG. 7.

In block 1302, the processing device may receive a wake up condition in the first power domain (e.g., power domain 400a, 400b in FIGS. 4 and 5). A wake up condition may be a condition for changing the first power domain to a high power, "ON", state. Receiving a wake up condition may be based on monitoring a power draw, a temperature, an interrupt, and/or input/output activity of a component of the first power domain, including any of a multicore processor (e.g., multicore processor 14a, 14b, 14c in FIGS. 4 and 5), a processor core (e.g., processor core 300a, 300b, 300c, 300d, 300e, 300f in FIGS. 4 and 5), and a processor cache including a private cache (e.g., private cache 302a, 302b, 302c, 302d, 302e, 302f in FIGS. 4 and 5) or a shared cache (e.g., shared cache 304a, 304b, 304c in FIGS. 4 and 5). An increase in a monitored level of power draw, temperature, and/or input/output activity, may indicate to the processing device that a wake up event has occurred in the first power domain. In some aspects, the processing device may perform the operations in block 1302 for N power domains.

In determination block 1304, the processing device may determine whether a first split snoop directory (e.g., split snoop directory 310a, 310b in FIGS. 3-5) for the first power domain is already powered up. In some aspects, the processing device may perform the operations in determination block 1304 for N power domains and N split snoop directories.

In response to determining that the first split snoop directory associated with the first power domain is not already powered up (i.e., determination block 1304="No"), the processing device may power up the first split snoop directory in block 1314. In some aspects, the processing device may perform the operations in block 1314 for N power domains and N split snoop directories.

In response to determining that the first split snoop directory associated with the first power domain is already powered up (i.e., determination block 1304="Yes"), the processing device may determine whether the first split snoop directory is enabled in determination block 1306. In some aspects, the processing device may perform the operations in determination block 1306 for N power domains and N split snoop directories.

In response to determining that the first split snoop directory is not enabled (i.e., determination block 1306="No") or after powering up the first split snoop directory in block 1314, the processing device may trigger tag initialization for the first split snoop directory associated with the first power domain, and trigger enabling the first split snoop directory associated with the first power domain in block 1308. In some aspects, the processing device may perform the operations in block 1308 for N power domains and N split snoop directories.

In block 1310, the processing device may enable the first split snoop directory associated with the first power domain. In some aspects, the processing device may perform the operations in block 1310 for N power domains and N split snoop directories.

In response to determining that the first split snoop directory associated with the first power domain is enabled (i.e., determination block 1306="Yes") or after enabling the first split snoop directory in block 1310, the processing device may send an acknowledgment of enablement of the first split snoop directory in block 1312. In some aspects, the processing device may perform the operations in block 1312 for N power domains and N split snoop directories.

Figure 14:
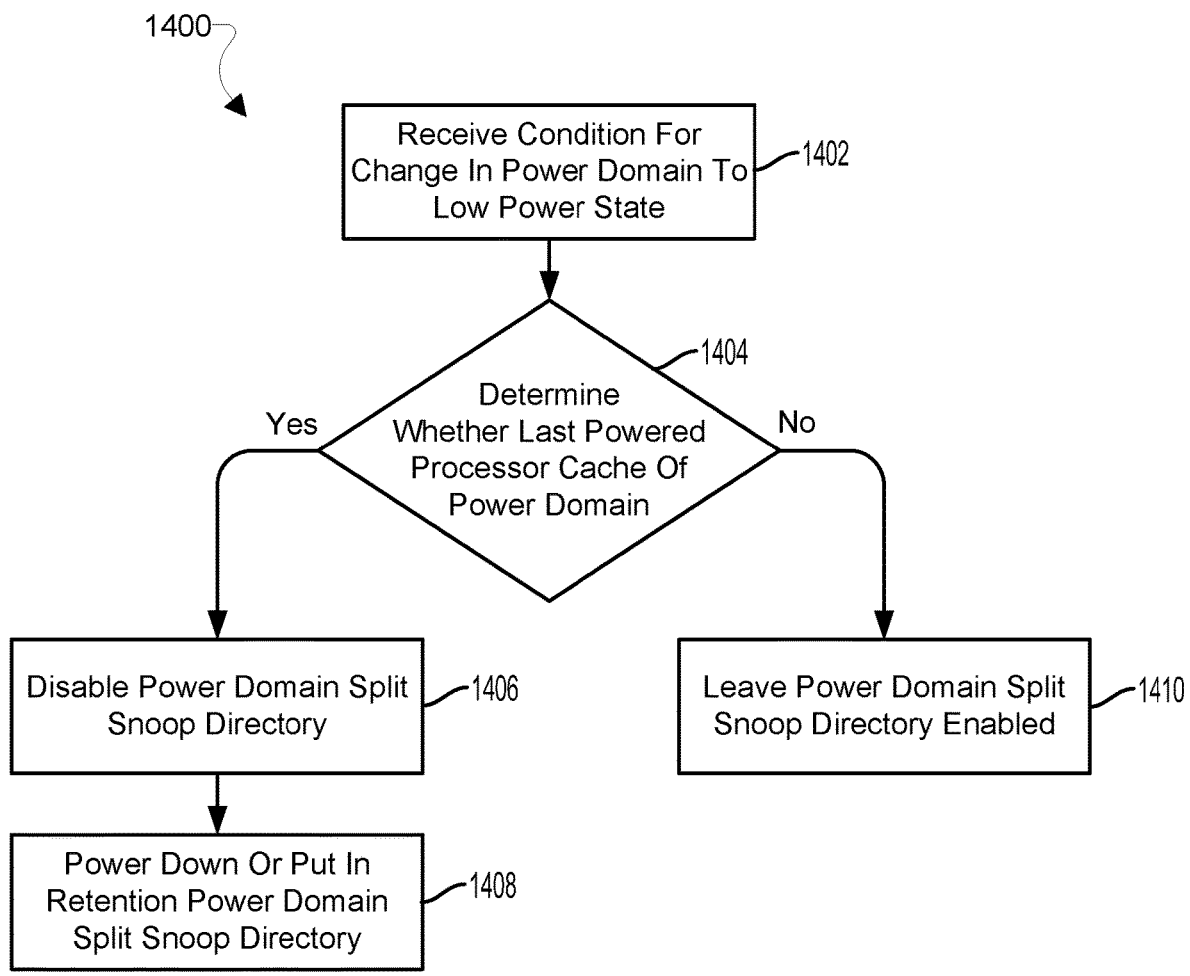
FIG. 14 is a process flow diagram illustrating a method for implementing split snoop directory disabling for multiple power domains with multicore processor state signaling according to an aspect.

FIG. 14 illustrates a method 1400 for implementing split snoop directory disabling for multiple power domains with multicore processor state signaling according to an aspect. The method 1400 may be implemented for any number N power domains in which N is an integer greater than 1. The method 1400 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a processor and dedicated hardware, such as a processor executing software within a split snoop directory system that includes other individual components. In order to encompass the alternative configurations enabled in the various aspects, the hardware implementing the method 1400 is referred to herein as a "processing device." In various aspects, the method 1400 may be implemented as part of, in extension of, in conjunction with, or separate from the method 700 described with reference to FIG. 7.

In block 1402, the processing device may receive a condition for changing a first power domain (e.g., power domain 400a, 400b in FIGS. 4 and 5) to a low power state, including power down and retention states. Receiving a power down, "OFF", or retention (i.e., "RET") condition may be based on monitoring or receiving a signal of a power state, a power draw, a temperature, and/or input/output activity of a component of the first power domain, including any of a multicore processor (e.g., multicore processor 14a, 14b, 14c in FIGS. 4 and 5), a processor core (e.g., processor core 300a, 300b, 300c, 300d, 300e, 300f in FIGS. 4 and 5), and a processor cache including a private cache (e.g., private cache 302a, 302b, 302c, 302d, 302e, 302f in FIGS. 4 and 5) or a shared cache (e.g., shared cache 304a, 304b, 304c in FIGS. 4 and 5). A decrease or cessation in a monitored level of power draw, temperature, and/or input/output activity, may indicate to the processing device that a power down or retention event has occurred in the first power domain. In some aspects, the processing device may perform the operations in block 1402 for N power domains.

In determination block 1404, the processing device may determine whether the condition for changing to a low power state is for a last powered processor cache of the first power domain. In other words, the processor may determine whether changing to a low power state, either by powering down or putting into retention the processor cache, would result in all of the processor caches of the first power domain in an "OFF" or "RET" power state and none in an "ON" power state. In some aspects, the processing device may perform the operations in block 1404 for N power domains.

In response to determining that the condition for changing to a low power state is not for a last powered processor cache (i.e., determination block 1404="No"), the processing device may leave the first split snoop directory enabled in block 1410. In some aspects, the processing device may perform the operations in block 1410 for N power domains and N split snoop directories.

In response to determining that the condition for changing to a low power state is for a last powered processor cache (i.e., determination block 1404="Yes"), the processing device may disable the first split snoop directory associated with the first power domain in block 1406. In some aspects, the processing device may perform the operations in block 1406 for N power domains and N split snoop directories.

In block 1408, the processing device may power down or put into retention the first split snoop directory associated with the first power domain. In some aspects, the processing device may perform the operations in block 1408 for N power domains and N split snoop directories.

In the methods 700, 1300, 1400 described herein, the transmission (i.e., sending and receiving) of signals, requests, and acknowledgements may occur between the split snoop directory power controllers (e.g., the split snoop directory power controllers 404a, 404b in FIGS. 4 and 5) and the power domain (e.g., the power domain 400a, 400b in FIGS. 4 and 5).

Figure 15:
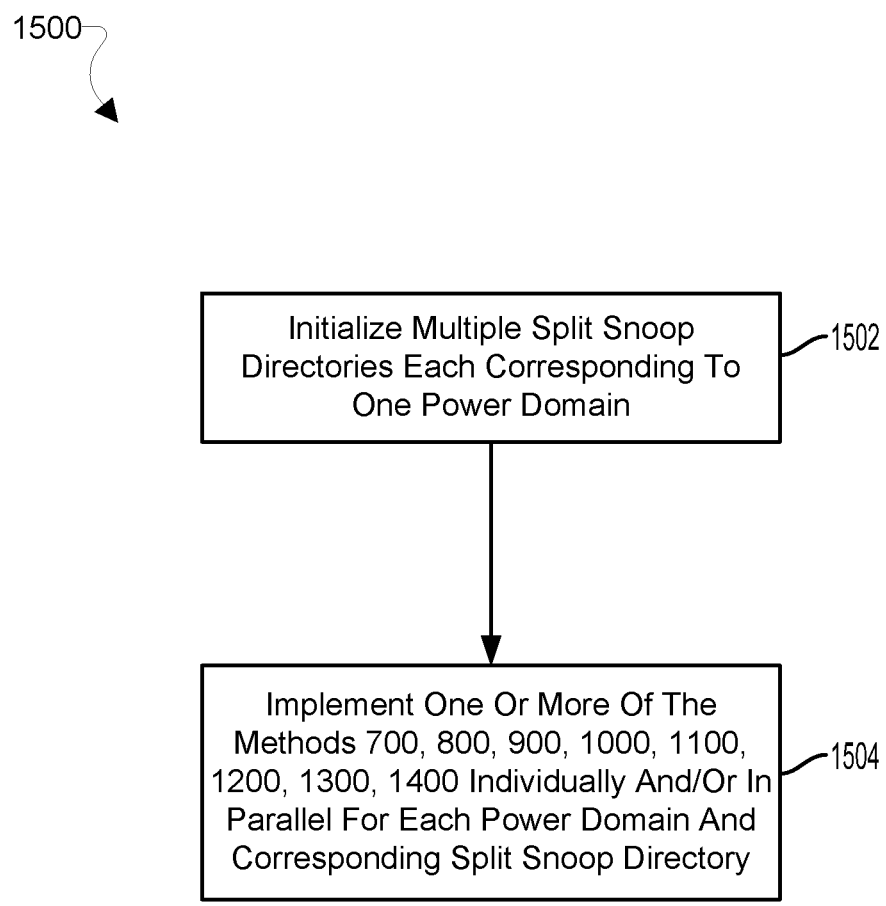
FIG. 15 is a process flow diagram illustrating a method for implementing split snoop directories for multiple power domains according to an aspect.

FIG. 15 illustrates a method 1500 for implementing split snoop directories for multiple power domains according to an aspect. The method 1500 may be implemented for any number N power domains in which N is an integer greater than 1. The method 1500 may be implemented in a computing device in software executing in a processor (e.g., the processor 14 in FIGS. 1 and 2), in general purpose hardware, in dedicated hardware (e.g., split snoop directory power controllers 404a, 404b and/or processor cache power controllers 402a, 402b, 402c in FIGS. 4 and 5), or in a combination of a processor and dedicated hardware, such as a processor executing software within a split snoop directory system that includes other individual components. In order to encompass the alternative configurations enabled in the various aspects, the hardware implementing the method 1500 is referred to herein as a "processing device."

In block 1502, the processing device may initialize multiple split snoop directories (e.g., split snoop directory 310a, 310b in FIGS. 3-5) each corresponding to one power domain (e.g., power domain 400a, 400b in FIGS. 4 and 5). In various aspects, the processing device may initialize the first split snoop directory for the first power domain and the second split snoop directory for the second power domain. The first power domain may include a first plurality of processor caches (e.g., private cache 302a, 302b, 302c, 302d, 302e, 302f and/or shared cache 304a, 304b, 304c in FIGS. 4 and 5) and the second power domain include at least one processor cache. In some aspects, the processing device may perform the operations in block 1502 for N (i.e., first, second, third, fourth, etc.) power domains and N (i.e., first, second, third, fourth, etc.) split snoop directories.

In block 1504, the processing device may implement one or more of the methods 700, 800, 900, 1000, 1100, 1200, 1300, 1400 described with reference to FIGS. 7-14, individually and/or in parallel for each power domain and corresponding split snoop directory. This may include the first power domain and corresponding first split snoop directory and the second power domain and corresponding second split snoop directory. In some aspects, the processing device may perform the operations in block 1504 for N power domains and N split snoop directories.

Figure 16:
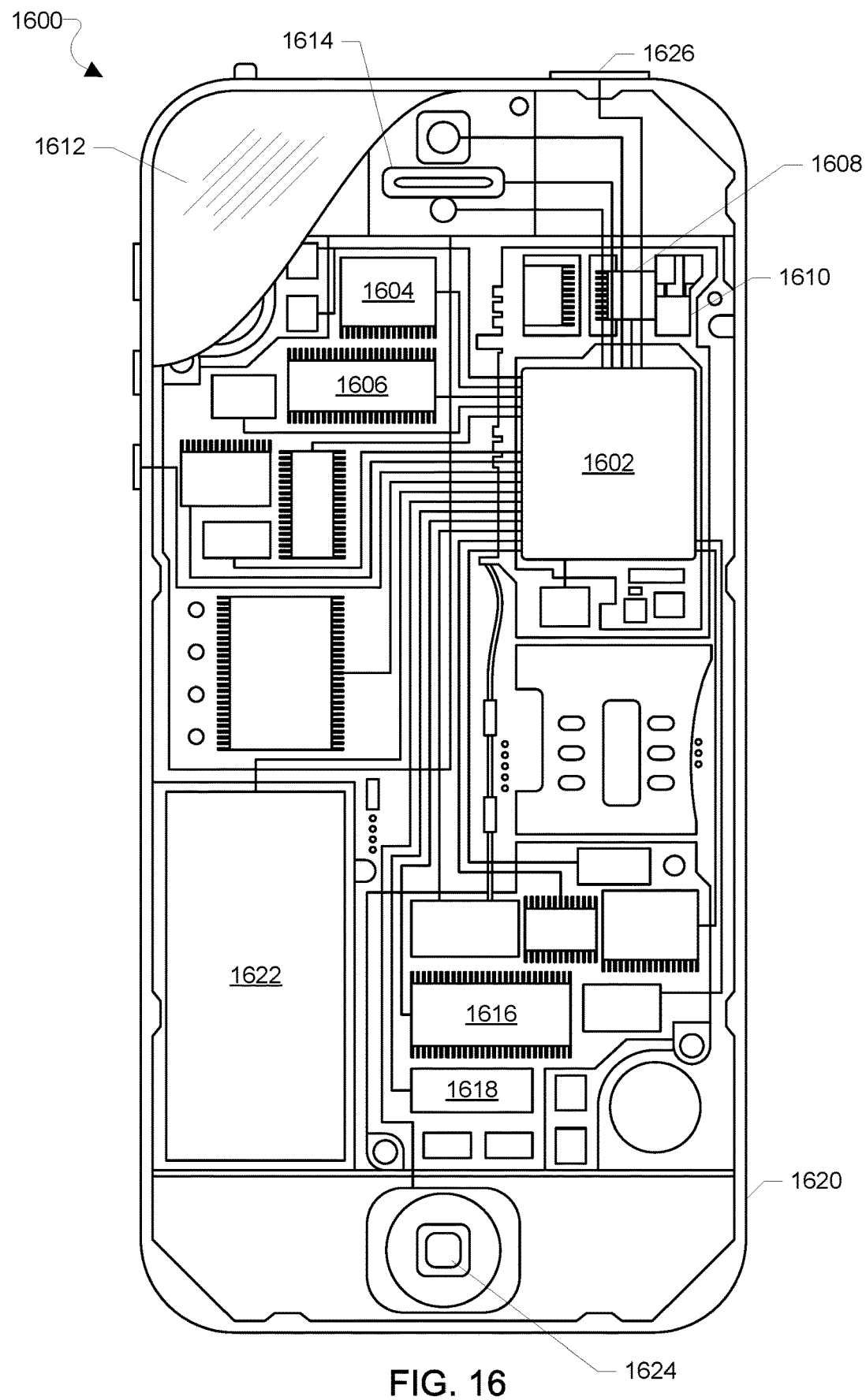
FIG. 16 is a component block diagram illustrating an example mobile computing device suitable for use with the various aspects.

The various aspects (including, but not limited to, aspects described above with reference to FIGS. 1-15) may be implemented in a wide variety of computing systems including mobile computing devices, an example of which suitable for use with the various aspects is illustrated in FIG. 16. The mobile computing device 1600 may include a processor 1602 coupled to a touchscreen controller 1604 and an internal memory 1606. The processor 1602 may be one or more multicore integrated circuits designated for general or specific processing tasks. The internal memory 1606 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1604 and the processor 1602 may also be coupled to a touchscreen panel 1612, such as a resistive-sensing touchscreen, capacitive-sensing touchscreen, infrared sensing touchscreen, etc. Additionally, the display of the computing device 1600 need not have touch screen capability.

The mobile computing device 1600 may have one or more radio signal transceivers 1608 (e.g., Peanut, Bluetooth, Zigbee, Wi-Fi, RF radio) and antennae 1610, for sending and receiving communications, coupled to each other and/or to the processor 1602. The transceivers 1608 and antennae 1610 may be used with the above-mentioned circuitry to implement the various wireless transmission protocol stacks and interfaces. The mobile computing device 1600 may include a cellular network wireless modem chip 1616 that enables communication via a cellular network and is coupled to the processor.

The mobile computing device 1600 may include a peripheral device connection interface 1618 coupled to the processor 1602. The peripheral device connection interface 1618 may be singularly configured to accept one type of connection, or may be configured to accept various types of physical and communication connections, common or proprietary, such as Universal Serial Bus (USB), FireWire, Thunderbolt, or PCIe. The peripheral device connection interface 1618 may also be coupled to a similarly configured peripheral device connection port (not shown).

The mobile computing device 1600 may also include speakers 1614 for providing audio outputs. The mobile computing device 1600 may also include a housing 1620, constructed of a plastic, metal, or a combination of materials, for containing all or some of the components described herein. The mobile computing device 1600 may include a power source 1622 coupled to the processor 1602, such as a disposable or rechargeable battery. The rechargeable battery may also be coupled to the peripheral device connection port to receive a charging current from a source external to the mobile computing device 1600. The mobile computing device 1600 may also include a physical button 1624 for receiving user inputs. The mobile computing device 1600 may also include a power button 1626 for turning the mobile computing device 1600 on and off.

Figure 17:
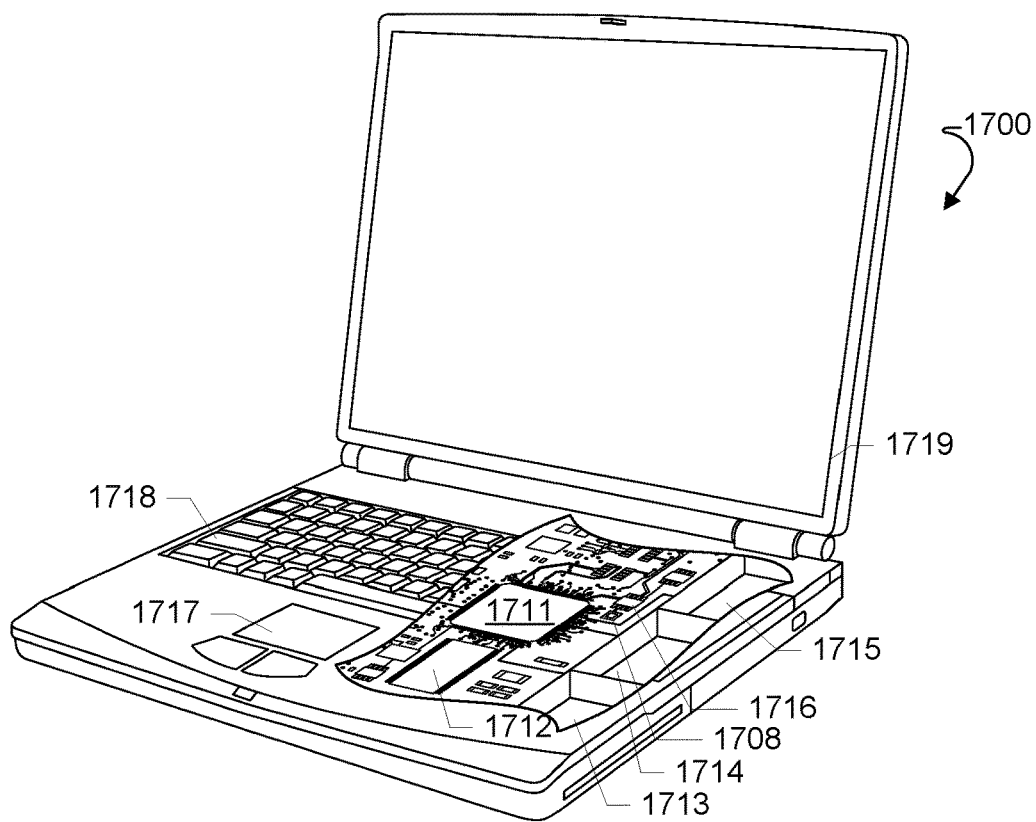
FIG. 17 is a component block diagram illustrating an example mobile computing device suitable for use with the various aspects.

The various aspects (including, but not limited to, aspects described above with reference to FIGS. 1-15) may be implemented in a wide variety of computing systems include a laptop computer 1700 an example of which is illustrated in FIG. 17. Many laptop computers include a touchpad touch surface 1717 that serves as the computer's pointing device, and thus may receive drag, scroll, and flick gestures similar to those implemented on computing devices equipped with a touch screen display and described above. A laptop computer 1700 will typically include a processor 1711 coupled to volatile memory 1712 and a large capacity nonvolatile memory, such as a disk drive 1713 of Flash memory. Additionally, the computer 1700 may have one or more antenna 1708 for sending and receiving electromagnetic radiation that may be connected to a wireless data link and/or cellular telephone transceiver 1716 coupled to the processor 1711. The computer 1700 may also include a floppy disc drive 1714 and a compact disc (CD) drive 1715 coupled to the processor 1711. In a notebook configuration, the computer housing includes the touchpad 1717, the keyboard 1718, and the display 1719 all coupled to the processor 1711. Other configurations of the computing device may include a computer mouse or trackball coupled to the processor (e.g., via a USB input) as are well known, which may also be used in conjunction with the various aspects.

Figure 18:
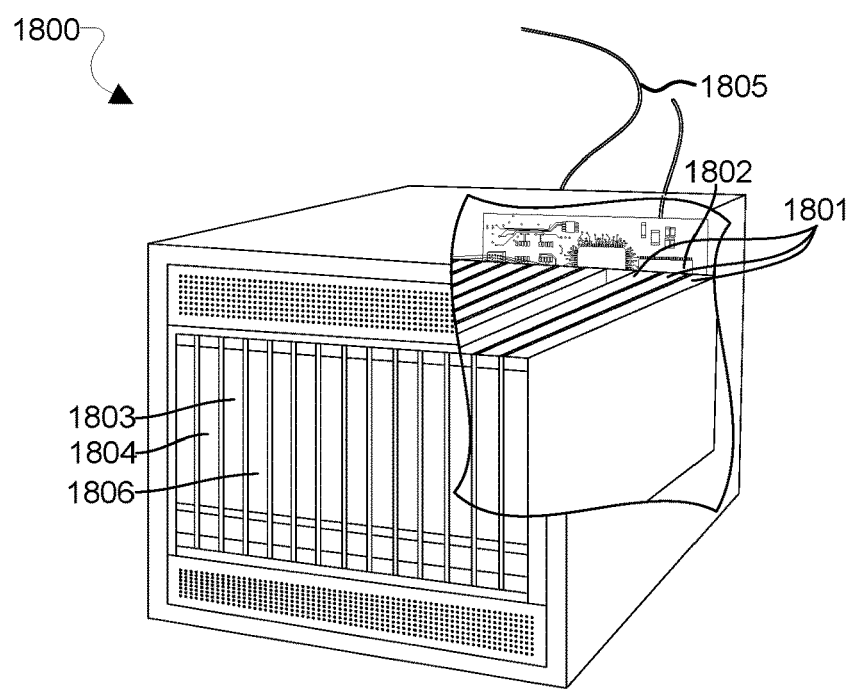
FIG. 18 is a component block diagram illustrating an example server suitable for use with the various aspects.

The various aspects (including, but not limited to, aspects described above with reference to FIGS. 1-15) may also be implemented in fixed computing systems, such as any of a variety of commercially available servers. An example server 1800 is illustrated in FIG. 18. Such a server 1800 typically includes one or more multicore processor assemblies 1801 coupled to volatile memory 1802 and a large capacity nonvolatile memory, such as a disk drive 1804. As illustrated in FIG. 18, multicore processor assemblies 1801 may be added to the server 1800 by inserting them into the racks of the assembly. The server 1800 may also include a floppy disc drive, compact disc (CD) or digital versatile disc (DVD) disc drive 1806 coupled to the processor 1801. The server 1800 may also include network access ports 1803 coupled to the multicore processor assemblies 1801 for establishing network interface connections with a network 1805, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of implementing multiple split snoop directories on a computing device, comprising:
    enabling a first split snoop directory configured with a first tag approach snoop directory architecture for a first power domain having at least a first multi-core processor and a second split snoop directory configured with a second tag approach snoop directory architecture for a second power domain having at least a second multi-core processor, wherein the first power domain includes a plurality of processor caches and the second power domain includes at least one processor cache, and wherein the first tag approach is different from the second tag approach;
    determining whether all of the plurality of processor caches in the first power domain are in a low power state; and
    disabling the first split snoop directory in response to determining that all of the plurality of processor caches in the first power domain are in a low power state.

2. The method of claim 1, further comprising:
    detecting a condition for changing at least one processor cache of the plurality of processor caches in the first power domain to a low power state; and
    sending a request to change the first split snoop directory to a low power state in response to detecting the condition for changing the at least one processor cache to a low power state.

3. The method of claim 2, further comprising receiving the request to change the first split snoop directory to a low power state,
    wherein determining whether all of the plurality of processor caches in the first power domain are in a low power state comprises determining whether all of the plurality of processor caches in the first power domain are in a low power state in response to receiving the request to change the first split snoop directory to a low power state.

4. The method of claim 1, further comprising receiving a condition for changing at least one processor cache of the plurality of processor caches in the first power domain to a low power state,
    wherein determining whether all of the plurality of processor caches in the first power domain are in a low power state comprises determining whether all of the plurality of processor caches in the first power domain are in a low power state in response to detecting the condition for changing the at least one processor cache to a low power state.

5. The method of claim 4, wherein receiving a condition for changing at least one processor cache of the plurality of processor caches in the first power domain to a low power state comprises receiving a signal indicating a power state of the at least one processor cache of the plurality of processor caches in the first power domain from the first power domain.

6. The method of claim 1, further comprising leaving the first split snoop directory enabled in response to determining that at least one processor cache of the plurality of processor caches in the first power domain is in a high power state.

7. The method of claim 1, further comprising:
    detecting a condition for changing at least one processor cache of the plurality of processor caches in the first power domain to a high power state; and
    enabling the first split snoop directory in response to detecting the condition for changing the at least one processor cache to a high power state and determining that the plurality of processor caches in the first power domain are in a low power state.

8. The method of claim 7, wherein:
    a low power state includes one of an "OFF" state and a "RET" (retention) state; and
    a high power state includes an "ON" state.

9. The method of claim 1, further comprising:
    enabling N split snoop directories for N power domains and M split snoop directories for M power domains, wherein N and M are integers greater than 1, the N power domains include N pluralities of processor caches and the M power domains include at least one processor cache;
    determining whether all of any of the plurality of processor caches in the N power domains are in a low power state; and
    disabling any of the N split snoop directories for which all of the plurality of processor caches in the N power domains are in a low power state.

10. A computing device configured to implement multiple split snoop directories, comprising:
    a first power domain including a plurality of processor caches;
    a second power domain including at least one processor cache;
    a coherent interconnect having a first split snoop directory configured with a first tag approach snoop directory architecture for the first power domain having at least a first multi-core processor and a second split snoop directory configured with a second tag approach snoop directory architecture for the second power domain having at least a second multi-core processor, wherein the first tag approach is different from the second tag approach;
    a first processing device communicatively connected to the first power domain and communicatively connected to the coherent interconnect; and
    a second processing device communicatively connected to the second power domain and communicatively connected to the coherent interconnect,
    wherein the first processing device is configured to perform operations comprising:
        enabling the first split snoop directory;
        determining whether all of the plurality of processor caches in the first power domain are in a low power state; and
        disabling the first split snoop directory in response to determining that all of the plurality of processor caches in the first power domain are in a low power state.

11. The computing device of claim 10, further comprising a third processing device communicatively connected to the first power domain and communicatively connected to the first processing device, the third processing device configured to perform operations comprising:

detecting a condition for changing at least one processor cache of the plurality of processor caches in the first power domain to a low power state; and sending a request to the first processing device to change the first split snoop directory to a low power state in response to detecting the condition for changing the at least one processor cache to a low power state.

12. The computing device of claim 11, wherein the first processing device is configured to perform operations further comprising receiving the request to change the first split snoop directory to a low power state, wherein the first processing device is configured to perform operations such that determining whether all of the plurality of processor caches in the first power domain are in a low power state comprises determining whether all of the plurality of processor caches in the first power domain are in a low power state in response to receiving the request to change the first split snoop directory to a low power state.

13. The computing device of claim 10, wherein the first processing device is configured to perform operations further comprising receiving a condition for changing at least one processor cache of the plurality of processor caches in the first power domain to a low power state, wherein the first processing device is configured to perform operations such that determining whether all of the plurality of processor caches in the first power domain are in a low power state comprises determining whether all of the plurality of processor caches in the first power domain are in a low power state in response to detecting the condition for changing the at least one processor cache to a low power state.

14. The computing device of claim 13, wherein the first processing device is configured to perform operations such that receiving a condition for changing at least one processor cache of the plurality of processor caches in the first power domain to a low power state comprises receiving a signal indicating a power state of the at least one processor cache of the plurality of processor caches in the first power domain from the first power domain.

15. The computing device of claim 10, wherein the first processing device is configured to perform operations further comprising leaving the first split snoop directory enabled in response to determining that at least one processor cache of the plurality of processor caches in the first power domain is in a high power state.

16. The computing device of claim 10, further comprising a third processing device communicatively connected to the first power domain and communicatively connected to the first processing device, the third processing device configured to perform operations comprising detecting a condition for changing at least one processor cache of the plurality of processor caches in the first power domain to a high power state; and wherein the first processing device is configured to perform operations further comprising enabling the first split snoop directory in response to the third processing device detecting the condition for changing the at least one processor cache to a high power state and determining that the plurality of processor caches in the first power domain are in a low power state.

17. The computing device of claim 16, wherein:
a low power state includes one of an "OFF" state and a "RET" (retention) state; and
a high power state includes an "ON" state.

18. The computing device of claim 16, wherein the first processing device and the third processing device are the same processing device.

19. The computing device of claim 10, further comprising:
N power domains including a plurality of processor caches; and
M power domains including at least one processor cache, wherein the first processing device is configured to perform operations further comprising:
enabling N split snoop directories for the N power domains and M split snoop directories for the M power domains, wherein N and M are integers greater than 1;
determining whether all of any of the plurality of processor caches in the N power domains are in a low power state; and
disabling any of the N split snoop directories for which all of the plurality of processor caches in the N power domains are in a low power state.

20. A computing device configured to implement multiple split snoop directories, comprising:
means for enabling a first split snoop directory configured with a first tag approach snoop directory architecture for a first power domain having at least a first multi-core processor and a second split snoop directory configured with a second tag approach snoop directory architecture for a second power domain having at least a second multi-core processor, wherein the first power domain includes a plurality of processor caches and the second power domain includes at least one processor cache, and wherein the first tag approach is different from the second tag approach;
means for determining whether all of the plurality of processor caches in the first power domain are in a low power state; and
means for disabling the first split snoop directory in response to determining that all of the plurality of processor caches in the first power domain are in a low power state.

21. The computing device of claim 20, further comprising:
means for detecting a condition for changing at least one processor cache of the plurality of processor caches in the first power domain to a low power state; and
means for sending a request to change the first split snoop directory to a low power state in response to detecting the condition for changing the at least one processor cache to a low power state.

22. The computing device of claim 21, further comprising means for receiving the request to change the first split snoop directory to a low power state, wherein means for determining whether all of the plurality of processor caches in the first power domain are in a low power state comprises means for determining whether all of the plurality of processor caches in the first power domain are in a low power state in response to receiving the request to change the first split snoop directory to a low power state.

23. The computing device of claim 20, further comprising means for receiving a condition for changing at least one processor cache of the plurality of processor caches in the first power domain to a low power state, wherein means for determining whether all of the plurality of processor caches in the first power domain are in a low power state comprises means for determining whether all of the plurality of processor caches in the first power domain are in a low power state in response to detecting the condition for changing the at least one processor cache to a low power state.

24. The computing device of claim 23, wherein means for receiving a condition for changing at least one processor cache of the plurality of processor caches in the first power domain to a low power state comprises means for receiving a signal indicating a power state of the at least one processor cache of the plurality of processor caches in the first power domain from the first power domain.

25. The computing device of claim 20, further comprising means for leaving the first split snoop directory enabled in response to determining that at least one processor cache of the plurality of processor caches in the first power domain is in a high power state.

26. The computing device of claim 25, further comprising:
means for detecting a condition for changing at least one processor cache of the plurality of processor caches in the first power domain to a high power state; and
means for enabling the first split snoop directory in response to detecting the condition for changing the at least one processor cache to a high power state and determining that the plurality of processor caches in the first power domain are in a low power state.

27. The computing device of claim 26, wherein:
a low power state includes one of an "OFF" state and a "RET" (retention) state; and
a high power state includes an "ON" state.

28. The computing device of claim 20, further comprising:
means for enabling N split snoop directories for N power domains and M split snoop directories for M power domains, wherein N and M are integers greater than 1, the N power domains include N pluralities of processor caches, and the M power domains include at least one processor cache;
means for determining whether all of any of the plurality of processor caches in the N power domains are all in a low power state; and
means for disabling any of the N split snoop directories for which all of the plurality of processor caches in the N power domains are in a low power state.

29. A non-transitory processor-readable storage medium having stored thereon processor-executable instructions configured to cause a processor of a computing device to perform operations comprising:
enabling a first split snoop directory configured with a first tag approach snoop directory architecture for a first power domain having at least a first multi-core processor and a second split snoop directory configured with a second tag approach snoop directory architecture for a second power domain having at least a second multi-core processor, wherein the first power domain includes a plurality of processor caches and the second power domain includes at least one processor cache, and wherein the first tag approach is different from the second tag approach;
determining whether all of the plurality of processor caches in the first power domain are in a low power state; and
disabling the first split snoop directory in response to determining that all of the plurality of processor caches in the first power domain are in a low power state.

30. The non-transitory processor-readable storage medium of claim 29, wherein the stored processor-executable instructions are configured to cause the processor to perform operations further comprising:
detecting a condition for changing at least one processor cache of the plurality of processor caches in the first power domain to a low power state;
sending a request to change the first split snoop directory to a low power state in response to detecting the condition for changing the at least one processor cache to a low power state; and
receiving the request to change the first split snoop directory to a low power state,
wherein determining whether all of the plurality of processor caches in the first power domain are in a low power state comprises determining whether all of the plurality of processor caches in the first power domain are in a low power state in response to receiving the request to change the first split snoop directory to a low power state.

* * * * *